(12) United States Patent
Morita et al.

(10) Patent No.: US 11,680,148 B2
(45) Date of Patent: Jun. 20, 2023

(54) COMPOSITE PARTICLES, COMPOSITE PARTICLE CURED PRODUCT, COMPOSITE PARTICLE IN-MOLD MOLDED ARTICLE, LAMINATE, COMPOSITE, AND METHOD FOR PRODUCING COMPOSITE PARTICLES

(71) Applicant: JSP Corporation, Tokyo (JP)

(72) Inventors: Toshio Morita, Tochigi (JP); Hidehiro Sasaki, Tochigi (JP); Tomohiro Hoshino, Kanuma (JP)

(73) Assignee: JSP Corporation, Tokyo (JP)

( * ) Notice: Subject to any disclaimer, the term of this patent is extended or adjusted under 35 U.S.C. 154(b) by 436 days.

(21) Appl. No.: 16/761,467

(22) PCT Filed: Nov. 8, 2018

(86) PCT No.: PCT/JP2018/041457
§ 371 (c)(1),
(2) Date: May 4, 2020

(87) PCT Pub. No.: WO2019/093414
PCT Pub. Date: May 16, 2019

(65) Prior Publication Data
US 2020/0392302 A1    Dec. 17, 2020

(30) Foreign Application Priority Data

Nov. 8, 2017  (JP) .............................. JP2017-215903
Apr. 5, 2018  (JP) .............................. JP2018-073316

(51) Int. Cl.
C08J 9/35   (2006.01)
C08K 7/02   (2006.01)
B29C 67/20  (2006.01)
B32B 5/24   (2006.01)
C08J 9/36   (2006.01)

(52) U.S. Cl.
CPC ................. *C08J 9/35* (2013.01); *B29C 67/20* (2013.01); *B32B 5/24* (2013.01); *C08J 9/36* (2013.01); *C08K 7/02* (2013.01)

(58) Field of Classification Search
CPC ....... C08J 9/35; C08J 9/36; C08J 9/224; C08J 9/232; C08J 2300/22; C08J 2367/00;
(Continued)

(56) References Cited

U.S. PATENT DOCUMENTS

2017/0239895 A1   8/2017  Takehara et al.
2018/0162093 A1*  6/2018  Sasaki ..................... B32B 15/16

FOREIGN PATENT DOCUMENTS

CN      106661261 A    5/2017
CN      106794637 A    5/2017
(Continued)

OTHER PUBLICATIONS

International Search Report for PCT/JP2018/041457, dated Jan. 22, 2019, and English Translation submitted herewith (5 pages).

*Primary Examiner* — K. Boyle
(74) *Attorney, Agent, or Firm* — Fitch, Even, Tabin & Flannery LLP

(57) ABSTRACT

Provided are composite particles in which reinforcing fibers adhere to the surface of thermoplastic resin expanded beads via a thermosetting resin being in an uncured state, a cured product of the composite particles, an in-mold molded article of the composite particles, a laminate of the composite particles and a reinforcing fiber sheet material, a composite of the composite particles, and a method for producing composite particles.

11 Claims, 2 Drawing Sheets

(58) Field of Classification Search
CPC ... C08J 2367/04; C08J 2400/24; B29C 67/20; B29C 67/207; B29C 44/3461; B32B 5/24; B32B 2260/025; B32B 2260/046; B32B 5/022; B32B 5/16; B32B 2262/0276; B32B 5/30; B32B 2262/0223; B32B 2262/101; B32B 2262/103; B32B 2262/105; B32B 2262/106; B32B 2264/025; B32B 2264/0257; B32B 2264/0264; B32B 2264/0278; B32B 2264/0285; B32B 2307/732; C08K 7/02; C08K 7/06; C08K 7/14; C08L 67/04; C08L 2207/53; B29K 2067/00; B29K 2105/04; B29K 2105/12

See application file for complete search history.

(56) References Cited

FOREIGN PATENT DOCUMENTS

| | | | | |
|---|---|---|---|---|
| JP | H07-314439 A | | 12/1995 | |
| JP | H07314439 A | * | 12/1995 | ............. B29B 13/10 |
| JP | 2000-319440 A | | 11/2000 | |
| JP | 2001-096558 A | | 4/2001 | |
| JP | 2002-249615 A | | 9/2002 | |
| JP | 2004-018773 A | | 1/2004 | |
| JP | 2006-265334 A | | 10/2006 | |
| JP | 5952979 B2 | | 7/2016 | |
| WO | 2006/043435 A1 | | 4/2006 | |
| WO | 2012/066872 A1 | | 5/2012 | |
| WO | WO-2016010089 A1 | * | 1/2016 | ........... B32B 15/046 |

* cited by examiner

[Fig. 1]
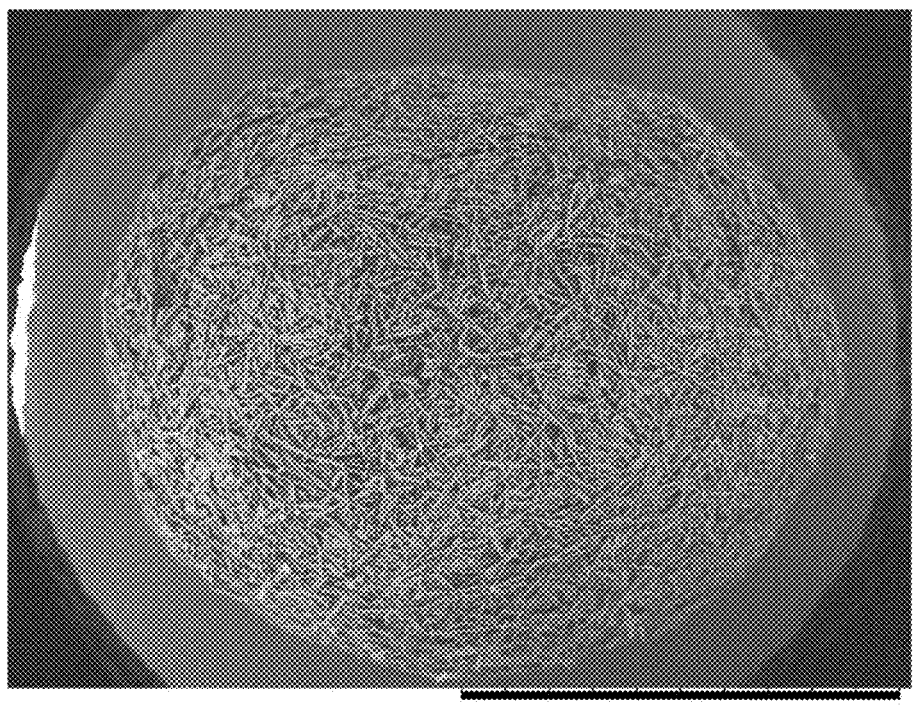
[Fig. 2]
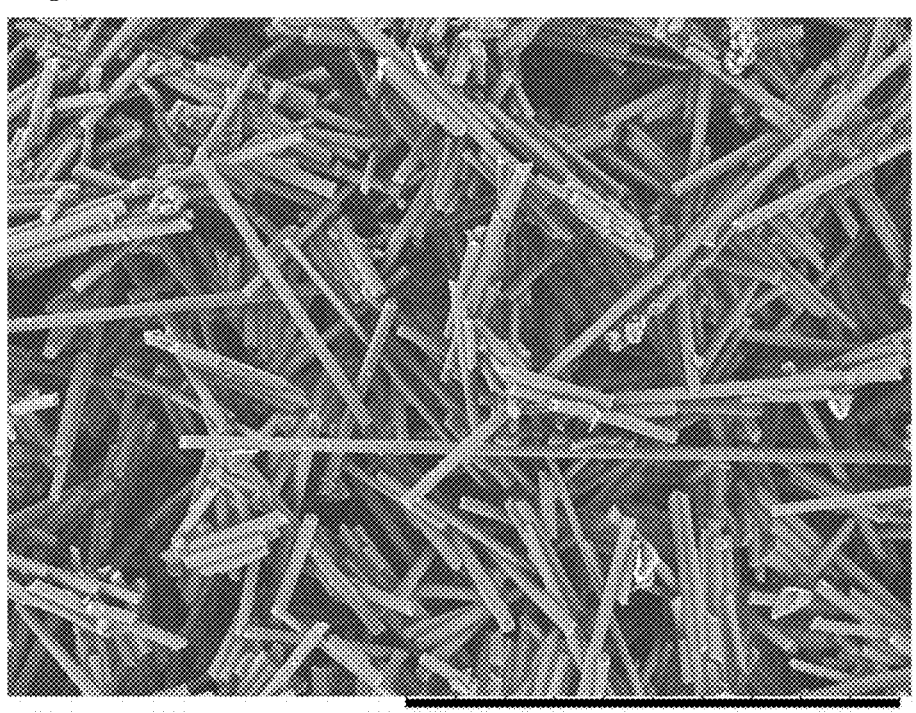

[Fig. 3]
[Fig. 4]
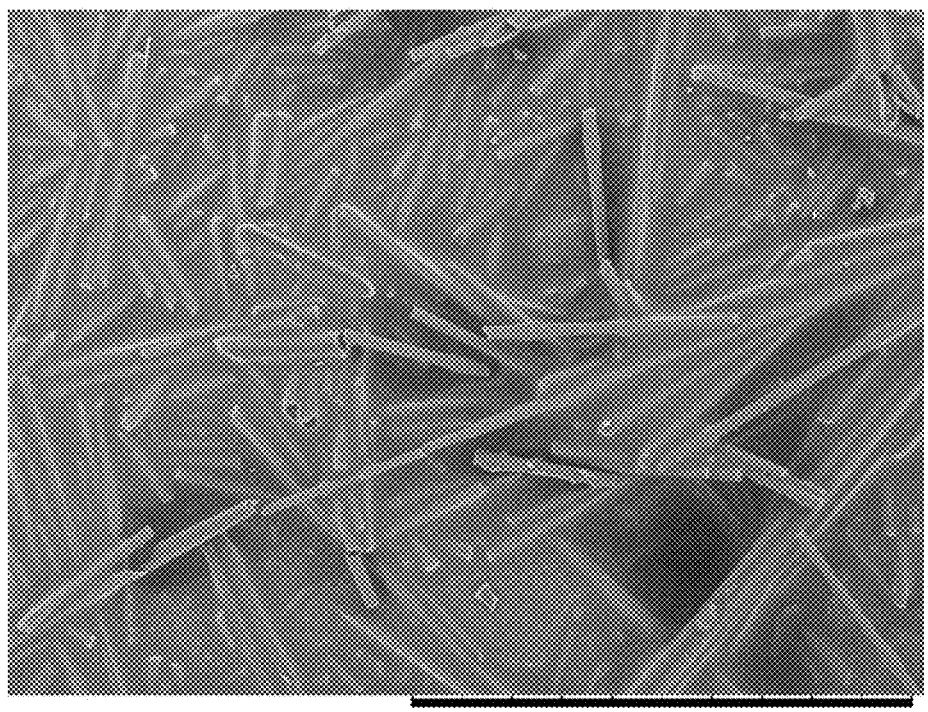

COMPOSITE PARTICLES, COMPOSITE PARTICLE CURED PRODUCT, COMPOSITE PARTICLE IN-MOLD MOLDED ARTICLE, LAMINATE, COMPOSITE, AND METHOD FOR PRODUCING COMPOSITE PARTICLES

CROSS-REFERENCE TO RELATED APPLICATIONS

This application is a U.S. national phase application filed under 35 U.S.C. § 371 of International Application Number PCT/JP2018/041457, filed Nov. 8, 2018, designating the United States, which claims priority from Japanese Application Number 2018-073316, filed Apr. 5, 2018, and Japanese Application Number 2017-215903, filed Nov. 8, 2017.

FIELD OF THE INVENTION

The present invention relates to composite particles containing expanded beads and a thermosetting resin being in an uncured state, a cured product of the composite particles, an in-mold molded article of the composite particles, and a method for producing the composite particles. Also, the present invention relates to a laminate and a composite using the above composite particles.

BACKGROUND OF THE INVENTION

Conventionally, in constituent materials of various structures such as buildings or transportation media, there has been a demand for a material which is lightweight and excellent in strength. In particular, structural members of vehicles, airplanes, etc. are being reduced in weight in order to reduce $CO_2$ emissions and to further improve low fuel consumption.

As one of means for weight reduction, the use of a carbon fiber composite material, which is a composite material in which carbon fibers and a thermosetting resin or a thermoplastic resin are integrated, is being increased.

Also, as a method of further reducing the weight of the above carbon fiber composite material, compounding of a foam and the carbon fiber composite material is also being investigated. For example, PTL 1 discloses a composite molded article in which aliphatic polyester-based resin-expanded beads, and a thermosetting resin cured product containing reinforcing fibers, which is formed between the expanded beads, are fixedly integrated, for the purpose of providing a composite molded article in which the strength is further improved.

CITATION LIST

Patent Literature

PTL 1: Japanese Patent No. 5952979

SUMMARY OF INVENTION

However, in the composite molded article disclosed in PTL 1, for example, in compounding with the reinforcing fibers, a mixture is obtained by mixing the expanded beads with the thermosetting resin composition containing the reinforcing fibers, and the above mixture forms an uncured-state expanded bead aggregate in an uncured state and in a solid state or a semi-solid state at room temperature. Therefore, from the viewpoint of handling, the composite molded article disclosed in PTL 1 has room for improvement. Also, since in order to obtain the composite molded article of PTL 1, the uncured expanded bead aggregate needs to be heated and cured within a mold, from the viewpoint of easy molding of a complicated shape, the composite molded article of PTL 1 has room for improvement.

An object of the present invention is to provide composite particles excellent in handling, which includes expanded beads and a thermosetting resin being in an uncured state. Also, another object is to provide a laminate from which a composite that is lightweight and excellent in strength can be obtained, and the composite that is lightweight and excellent in strength.

The present invention provides <1> to <14> described below.

<1> Composite particles in which reinforcing fibers adhere to a surface of thermoplastic resin expanded beads via a thermosetting resin being in an uncured state.

<2> The composite particles described in <1>, in which the thermosetting resin contains reinforcing fibers.

<3> The composite particles described in <1> or <2>, in which a weight ratio of the thermosetting resin to the reinforcing fibers in the composite particles is 5:95 to 95:5.

<4> The composite particles described in any one of <1> to <3>, in which a ratio of a total weight of the thermosetting resin and the reinforcing fibers to a weight of the expanded beads is 0.3 to 8.

<5> The composite particles described in any one of <1> to <4>, in which an average particle size of the composite particles is 1 to 10 mm.

<6> The composite particles described in any one of <1> to <5>, in which a thermoplastic resin constituting the expanded beads is a polyester-based resin.

<7> The composite particles described in any one of <1> to <6>, in which a bulk density of the composite particles is 30 to 700 $kg/m^3$.

<8> A composite particle cured product obtained by curing the thermosetting resin in the composite particles described in any one of <1> to <7>.

<9> A composite particle in-mold molded article of the composite particles described in any one of <1> to <7>.

<10> The composite particle in-mold molded article described in <9>, which has a voidage of 3 to 40% by volume.

<11> A method for producing composite particles in which reinforcing fibers adhere to a surface of thermoplastic resin expanded beads via a thermosetting resin being in an uncured state, the method including: mixing the thermoplastic resin expanded beads with the thermosetting resin being in the uncured state so as to form a covered product in which the expanded beads are covered with the thermosetting resin being in the uncured state; and mixing the covered product with the reinforcing fibers so that a thermosetting resin layer being in an uncured state and including the reinforcing fibers is formed on the surface of the expanded beads.

<12> A laminate in which a reinforcing fiber-sheet material is laminated and bonded on at least a part of a surface of a composite particle-molded article obtained by bonding composite particles to each other in which reinforcing fibers adhere to a surface of thermoplastic resin expanded beads via a thermosetting resin being in an uncured state, in which the composite particle-molded article has interconnected voids between the composite particles.

<13> A composite in which the voids of the laminate described in <12> are filled with a thermosetting resin.

<14> A composite of a thermosetting resin and a composite particle-molded article obtained by bonding composite particles to each other in which reinforcing fibers adhere to a surface of thermoplastic resin expanded beads via a thermosetting resin being in an uncured state, in which the composite particle-molded article has interconnected voids between the composite particles, and the voids are filled with the thermosetting resin.

In the composite particles of the present invention, reinforcing fibers adhere to the surface of thermoplastic resin expanded beads via a thermosetting resin being in an uncured state. Therefore, the composite particles hardly stick to each other, and a mold can be filled with the composite particles, etc. when molded. Then, it is easy to freely set the shape of a final molded product, and handling is excellent.

Also, the composite particle cured product obtained by curing the composite particles of the present invention is excellent in heat resistance and pressure resistance. Also, it is possible to withstand a molding temperature and a molding pressure in high cycle molding such as high-pressure resin transfer molding (HP-RTM molding).

Also, in the composite particle in-mold molded article obtained by molding the composite particles of the present invention within a mold, and bonding the composite particles, as compared to in a conventional reinforcing fiber composite molded article, reinforcing fibers can be more uniformly dispersed within the molded article. Also, it is also possible to disperse the reinforcing fibers at a high concentration within the molded article.

Also, according to the present invention, it is possible to produce a laminate from which a composite that is lightweight and excellent in strength despite its complicated shape can be obtained. Also, it is possible to provide a production method of a laminate excellent in moldability, the laminate from which a composite that is lightweight and excellent in strength can be obtained, and the composite that is lightweight and excellent in strength.

BRIEF DESCRIPTION OF DRAWINGS

FIG. 1 is an electron microscope photograph (×40) of composite particles in Example 1.

FIG. 2 is an electron microscope photograph (×300) of the surface of the composite particles in Example 1.

FIG. 3 is an electron microscope photograph (×40) of composite particles in Comparative Example 2.

FIG. 4 is an electron microscope photograph (×300) of the surface of the composite particles in Comparative Example 2.

DESCRIPTION OF EMBODIMENTS

<<Composite Particles>>

In composite particles of the present invention, a large number of reinforcing fibers adhere to the surface of thermoplastic resin expanded beads via a thermosetting resin being in an uncured state.

Hereinafter, the thermoplastic resin expanded beads, the reinforcing fibers, etc. constituting the composite particles of the present invention will be described in detail.

[Thermoplastic Resin Expanded Beads]

Examples of a thermoplastic resin constituting the thermoplastic resin expanded beads include a polyester-based resin, a polycarbonate-based resin, an acrylic resin, a polyphenylene ether-based resin, a polymethacrylimide resin, a polyolefin-based resin, a polystyrene-based resin, a polyamide-based resin, and the like. The thermoplastic resin may be used alone or in combination of two or more thereof.

Among these, the thermoplastic resin is preferably a polyolefin-based resin, a polyester-based resin, or a polyamide-based resin.

As for the polyester-based resin, a linear polyester obtained through polycondensation of dicarboxylic acid and dihydric alcohol may be generally employed. Examples of the polyester-based resin include an aromatic polyester-based resin, an aliphatic polyester-based resin, and the like.

The aromatic polyester-based resin is a polyester containing an aromatic dicarboxylic acid component and a diol component. Examples of the aromatic polyester-based resin include polyethylene terephthalate, polypropylene terephthalate, polybutylene terephthalate, polycyclohexanedimethylene terephthalate, polyethylene naphthalate, polybutylene naphthalate, and the like.

The aliphatic polyester-based resin is one containing aliphatic ester as a main component in the main chain. The content of the aliphatic ester in the main chain is at least 60 mol %, preferably 80 to 100 mol %, and more preferably 90 to 100 mol %. The aliphatic polyester-based resin includes a hydroxy acid polycondensate, a ring-opened polymer of lactone, a polycondensate of a polyhydric alcohol component and a polycarboxylic acid component, or the like. Examples of the hydroxy acid polycondensate include polylactic acid, a polycondensate of hydroxybutyric acid, and the like. Examples of the ring-opened polymer of lactone include polycaprolactone, polypropiolactone, and the like. Examples of the polycondensate of the polyhydric alcohol component and the polycarboxylic acid component include polybutylene succinate, polybutylene adipate, polyethylene succinate, and the like. Among these, from the viewpoint of preventing a volume reduction of expanded beads due to heat generation during curation of a thermosetting resin, it is preferable that the aliphatic polyester-based resin is a polylactic acid-based resin.

The polylactic acid-based resin includes polylactic acid, or a mixture of polylactic acid and another resin. It is preferable that the polylactic acid is a polymer containing 50 mol % or more of a lactic acid-derived component unit. Examples of the polylactic acid include (a) a polymer of lactic acid, (b) a copolymer of lactic acid and another aliphatic hydroxycarboxylic acid, (c) a copolymer of lactic acid, aliphatic polyhydric alcohol, and aliphatic polycarboxylic acid, (d) a copolymer of lactic acid and aliphatic polycarboxylic acid, (e) a copolymer of lactic acid and aliphatic polyhydric alcohol, (f) a mixture through any one of combinations of these (a) to (e), and the like. The polylactic acid also includes those called stereo complex polylactic acid, and stereo block polylactic acid. Specific examples of the lactic acid include L-lactic acid, D-lactic acid, DL-lactic acid or cyclic dimers thereof (L-lactide, D-lactide, and DL-lactide) or mixtures thereof. Also, the polylactic acid-based resin may be mixed with another thermoplastic resin and the like within a range in which the effect of the present invention is not impaired.

Examples of another aliphatic hydroxycarboxylic acid in the above (b) include glycolic acid, hydroxybutyric acid, hydroxyvaleric acid, hydroxycaproic acid, hydroxyheptanoic acid, and the like.

Examples of the aliphatic polyhydric alcohol in the above (c) and (e) include ethylene glycol, 1,4-butanediol, 1,6-hexanediol, 1,4-cyclohexanedimethanol, neopentyl glycol, decamethylene glycol, glycerin, trimethylolpropane, pentaerythritol, and the like.

Examples of the aliphatic polycarboxylic acid in the above (c) and (d) include succinic acid, adipic acid, suberic acid, cebacic acid, dodecanedicarboxylic acid, succinic anhydride, adipic anhydride, trimesic acid, propanetricarboxylic acid, pyromellitic acid, pyromellitic anhydride, and the like.

The polylactic acid-based resin preferably has crystallinity. Since the polylactic acid-based resin has crystallinity, during production of the composite particles, it is possible to prevent and suppress a volume reduction of expanded beads, an occurrence of a gap at the interface with a thermosetting resin due to thermal contraction of the expanded beads, or an occurrence of a sink mark on an in-mold molded article of the composite particles.

A method of obtaining polylactic acid-based resin-expanded beads in which crystallization is advanced is not particularly limited as long as in the method, the degree of crystallinity of the polylactic acid-based resin is adjustable. Examples thereof may include a method of promoting crystallization of a polylactic acid-based resin by performing heat treatment in a foaming step, and obtaining expanded beads, and a method of subjecting expanded beads to heat treatment under the atmosphere of 65° C. or more. Also, the temperature at which the expanded beads are subjected to the heat treatment is preferably 66 to 80° C., and more preferably 67 to 75° C. Also, the heat treatment time is preferably 8 hours or more, and the upper limit is about 48 hours.

Also, it is preferable that the polyolefin-based resin is a resin containing 50% by weight or more of an olefin component. Specific examples of the polyolefin-based resin include a polyethylene-based resin, a polypropylene-based resin, and the like. These may be used alone or as a mixture of two or more thereof.

Examples of the polyamide-based resin include polyamide, a polyamide copolymer, and the like.

Examples of the polyamide include polyhexamethylene adipamide, polyhexamethylene sebacamide, polyhexamethylene dodecamide, polytetramethylene adipamide, and the like, which are obtained by polycondensation of diamine and carboxylic acid, polycaproamide obtained by ring-opening polymerization of lactam, and the like.

Examples of the polyamide copolymer include polycaproamide/polyhexamethylene, caprolactam/hexamethylene aminoadipic acid/lauryllactam, caprolactam/lauryllactam copolymer, and the like.

At least one of a glass transition temperature and a melting temperature of the thermoplastic resin constituting the thermoplastic resin expanded beads is preferably 60° C. or more, more preferably 100° C. or more, and further preferably 120° C. or more from the viewpoint of heat resistance of the composite particles. Then, from the viewpoint of productivity of thermoplastic expanded beads, it is preferably 400° C. or less, more preferably 200° C. or less, and further preferably 180° C. or less.

The glass transition temperature of the thermoplastic resin constituting the thermoplastic resin expanded beads may be found as a midpoint glass transition temperature of a DSC curve obtained by heat flux differential scanning calorimetry in accordance with JIS K7121-1987 without defoaming the thermoplastic resin expanded beads. Also, as a test piece for finding the glass transition temperature, the test piece is produced in accordance with "when a glass transition temperature is measured after a certain heat treatment is performed" described in '3. condition adjustment of test piece (3)' of JIS K7121-1987. Specifically, in a container of a DSC device, the test piece is heated and dissolved by a temperature rise up to 200° C. at a heating rate of 10° C./min, and is immediately cooled to 0° C. at a cooling rate of 10° C./min.

The melting temperature (the melting point) of the thermoplastic resin constituting the thermoplastic resin expanded beads is a value measured by heat flux differential scanning calorimetry in accordance with JIS K7121-1987 without defoaming the thermoplastic resin expanded beads. Specifically, as for a test piece, a test piece whose condition has been adjusted by the condition of '3. condition adjustment of test piece (2)' of JIS K7121-1987 (meanwhile, the cooling rate is 10° C./min) is used. The melting temperature is a temperature at the apex of a melting peak obtained by a temperature rise of the test piece at a heating rate of 10° C./min. Meanwhile, when two or more melting peaks occur, the temperature at the apex of a melting peak having the largest area is the melting point.

Examples of the thermoplastic resin expanded beads include pulverized matters of extruded foams, foamed strands, and foamed molded articles, and the like, as well as expanded beads obtained by foaming resin particles of a thermoplastic resin. Also, as for the expanded beads, tubular expanded beads having voids forming through-holes in the expanded beads, which are described in JP-A-08-108441, etc., may be used. Also, when the tubular expanded beads are used, a thermosetting resin adheres to at least the outer surface side of the expanded beads.

Also, as the shape of the resin particles, columnar, spherical, prismatic, elliptical spherical, cylindrical shapes, etc. may be employed. The expanded beads obtained by foaming these resin particles become expanded beads having a shape substantially corresponding to the shape of the resin particles prior to foaming (the above-mentioned columnar, spherical, prismatic, elliptical spherical, cylindrical shapes, etc.).

The average bead size of the expanded beads is preferably 1 mm or more, more preferably 2 mm or more, and preferably 10 mm or less, more preferably 5 mm or less. Within the above range, this is suitable for improving the strength of a composite molded article. Also, the average bead size of the expanded beads is an average value of values measured as maximum outer dimensions of at least 100 or more expanded beads.

Also, as for the expanded beads used in the present invention, not only single-layer expanded beads formed of only a foamed layer, but also expanded beads with a multi-layer structure may be used. Also, Specific examples of the expanded beads with a multi-layer structure include expanded beads formed of a foamed core layer, and a cover layer that covers the core layer. Also, the cover layer may be in a foamed state or a non-foamed state.

As for the above expanded beads with the multi-layer structure, for example, it is preferable to use a polylactic acid resin having a crystal structure, for the core layer. Also, it is preferable to use a polylactic acid resin that is not crystallized or is hardly crystallized (hereinafter, collectively referred to as a "low-crystalline polylactic acid-based resin"), for the cover layer. Since the low-crystalline polylactic acid-based resin has a property of being easily dissolved in a thermosetting resin or being swelled, when the polylactic acid-based resin in the cover layer is low-crystalline, expanded beads have high affinity with a thermosetting resin liquid raw material. Meanwhile, since the polylactic acid-based resin having the crystal structure is hardly dissolved in the thermosetting resin liquid raw material, and also is hardly swelled, when the polylactic acid resin in the core layer has the crystal structure, the shape of expanded beads is easily maintained. The polylactic acid-based resin-expanded beads as described above may be prepared by, for example, a method described in JP-A-2012-025869.

The bulk density of the expanded beads used in the composite particles of the present invention is preferably 10 kg/m$^3$ or more, more preferably 20 kg/m$^3$ or more, and further preferably 30 kg/m$^3$ or more, and is preferably 250 kg/m$^3$ or less, more preferably 200 kg/m$^3$ or less, and further preferably 150 kg/m$^3$ or less. Within the above range, the expanded beads exhibit a high weight-reduction effect. Also, since the expanded beads easily form a closed foam cell, the strength of the composite particles is improved.

Also, the bulk density of the expanded beads may be found as follows. A container such as a measuring cylinder is filled with he expanded beads through free fall. Then, the container is vibrated. The bulk volume of the expanded beads is a value of a scale of the measuring cylinder when the volume after vibration reaches a constant weight. The bulk density of the expanded beads may be found by dividing the total weight of the expanded beads with which the container is filled by the bulk volume.

The lower limit of the weight (the bead weight) per expanded bead is preferably 0.1 mg or more, more preferably 0.5 mg or more, and further preferably 0.8 mg or more from the viewpoint of maintaining a high closed cell ratio of the expanded beads. Then, the upper limit of the weight per expanded bead is preferably 20 mg or less, and more preferably 5 mg or less.

Also, the bead weight is an average bead weight that is obtained by randomly selecting 100 beads, collectively measuring the weight of the 100 selected beads, and calculating a value when the measured weight is divided by 100.

Examples of the expanded beads include, among polylactic acid-based resin foams (a product name: "LACTIF (registered trademark)" manufactured by JSP Corporation), expanded beads having a bulk density of 15 to 200 kg/m$^3$, and the like. Also, the expanded beads may also be obtained with reference to JP-B-53-1313, WO2012/086305, JP-A-2012-025869, and the like.

[Reinforcing Fibers]

The composite particles of the present invention contain reinforcing fibers. Examples of the reinforcing fiber include a glass fiber, a carbon fiber, a vinylon fiber, a polyester fiber, a ceramics fiber, a steel fiber, a stainless (SUS) fiber, an aluminum fiber, a boron fiber, and a combination of two or more of these. Among these, from the viewpoint of high strength, versatility, economic efficiency, and the like, it is particularly preferable that the reinforcing fiber is a glass fiber, a carbon fiber, or a vinylon fiber. Also, when the reinforcing fibers are compounded with a thermosetting resin, the reinforcing fibers may improve the strength of the composite particles.

In the composite particles of the present invention, the weight ratio of the thermosetting resin in the composite particles to the reinforcing fibers in the composite particles is preferably 5:95 to 95:5. The above weight ratio is preferably 30:70 to 85:15, and more preferably 50:50 to 75:25 from the viewpoint of the strength at the time of curing of the thermosetting resin, or the falling-off of the reinforcing fibers from expanded beads.

Also, the content of the reinforcing fibers in a thermosetting resin layer in the composite particles is measured by a method in accordance with JIS K7075-1991 7-(2) (a nitric acid decomposition method). Through the above method, in the composite particles, the weight of the expanded beads and the weight of the thermosetting resin layer in the composite particles, and the weight of the reinforcing fibers in the thermosetting resin layer in the composite particles are calculated. Then, when 10 composite particles are measured through the above operation, the average value is the content of the reinforcing fibers in the thermosetting resin layer. Therefore, from the above measurement, the weight ratio of the expanded beads, the weight ratio of the thermosetting resin, and the weight ratio of the reinforcing fibers, in the composite particles, are calculated.

An average fiber length L of the reinforcing fiber used for the composite particles of the present invention is preferably 0.05 mm or more and 1 mm or less. Within the above range, entanglement of fibers is likely to occur, and thus the impact resistance performance of the composite particles is improved, and the dispersion of fibers in the composite particles becomes more uniform.

The lower limit of the ratio L/D of the average fiber length L to the fiber diameter D in the reinforcing fibers used for the composite particles of the present invention is preferably 2 or more, more preferably 5 or more, and further preferably 10 or more. Then, the upper limit is preferably 100 or less. Within the above range, the improvement effect of mechanical properties of the composite particles is increased, and it is possible to form an in-mold molded article of the composite particles which is particularly excellent in the impact resistance.

Also, the average fiber length L and the fiber diameter D of the reinforcing fiber are measured by observation with an electron microscope. Also, the average fiber length L and the fiber diameter D are calculated by setting a parameter as an average value to 500 or more.

In the present invention, the thermosetting resin layer may contain an inorganic filler as well as the reinforcing fibers. Examples of the inorganic filler include a glass powder, or those generally called inorganic fillers such as silica, alumina, titanium oxide, iron oxide, zinc oxide, magnesium oxide, antimony oxide, barium ferrite, strontium ferrite, beryllium oxide, pumice, talc, kaolin, mica, sericite, borax, aluminum hydroxide, magnesium hydroxide, aluminum carbonate, calcium carbonate, barium sulfate, ammonium sulfate, calcium sulfite, and a combination of two or more of these. Among these, the inorganic filler is preferably silica or magnesium oxide.

The specific surface area of the inorganic filler is preferably 20 m$^2$/g or more, and more preferably 50 m$^2$/g or more, from the viewpoint of an adhering property between the reinforcing fibers and the expanded beads. The upper limit of the specific surface area is not particularly limited, but is preferably 500 m$^2$/g or less from the viewpoint of availability. The specific surface area may be found through a BET method by low temperature/low humidity physical adsorption of inert gas.

In particular, when the inorganic filler includes fumed silica or magnesium oxide with a specific surface area of 200 m$^2$/g, the viscosity of the thermosetting resin increases, and thus the bonding property between the thermosetting resin and the reinforcing fibers is further improved. Also, the fluidity of the thermosetting resin is reduced by the inorganic filler, and thus, the thermosetting resin hardly leaches on the surface of the composite particles. As a result, even when the addition amount of the reinforcing fibers is small, the fluidity of the composite particles is secured.

This inorganic filler is mixed in an amount of preferably 5 to 150 parts by weight, and more preferably 10 to 100 parts by weight, based on 100 parts by weight of the thermosetting resin. It is preferable to sufficiently disperse this inorganic filler in an uncured thermosetting resin liquid raw material.

[Thermosetting Resin]

A thermosetting resin is a resin that is in an uncured state, and may be cured by reacting with a curing agent.

The uncured state of the thermosetting resin includes not only an A stage state as a state in which curing has not progressed, but also a B stage state as a state in which curing has started to progress but the curing is not completed (a semi-cured state). The above A stage state, and the B stage state are defined in JIS K6900-1994. Also, the determination on whether the thermosetting resin is in a cured state or an uncured state is performed in accordance with the heat flux differential scanning calorimetry method described in JIS K7122-1987. Then, when a curing heat generation peak of the thermosetting resin is observed, it is determined that the thermosetting resin is in an uncured state. From the above viewpoint, the curing heat generation peak of the thermosetting resin layer is preferably observed at 110 to 180° C., and more preferably observed at 120 to 160° C. Also, the calorific value of the curing heat generation peak is preferably 3 J/g or more, and more preferably 5 J/g or more. Also, when the above curing heat generation peak overlaps a peak of another resin, calculation is performed by subtracting that quantity. Details will be described in Examples.

Examples of the thermosetting resin constituting the composite particles of the present invention include an unsaturated polyester-based resin, an epoxy-based resin, a vinyl ester-based resin, a phenol-based resin, a polyamide-based resin, an urea-based resin, a melamine-based resin, a polyimide-based resin, a diallyl phthalate-based resin, an urethane-based resin, and the like. Among these, from the viewpoint of an excellent bonding property with a thermoplastic resin constituting expanded beads, the thermosetting resin is preferably an unsaturated polyester-based resin, or one or a combination of two or more of epoxy-based resins, and more preferably includes an unsaturated polyester-based resin.

As for the unsaturated polyester-based resin, an unsaturated polyester resin, which is obtained by dissolving a condensation product obtained from unsaturated polycarboxylic acid and polyhydric alcohol, in a vinyl monomer, is preferred. Examples of the unsaturated polycarboxylic acid include maleic anhydride, fumaric acid, adipic acid, phthalic anhydride, isophthalic acid, and the like. Examples of the polyhydric alcohol include ethylene glycol, 1,3-butyleneglycol, diethylene glycol, propylene glycol, and the like. Examples of the vinyl monomer include a styrene-based monomer and the like.

Examples of the epoxy-based resin include a bisphenol-type epoxy-based resin such as a bisphenol A-type epoxy resin, a bisphenol F-type epoxy resin, and a bisphenol S-type epoxy resin; a novolac-type epoxy-based resin such as a phenol novolac-type epoxy resin and a cresol novolac-type epoxy resin; an alicyclic epoxy-based resin; a glycidyl ether-type epoxy-based resin; a glycidylated amine-type epoxy-based resin; a halogenated epoxy-based resin; or an addition polymer of an epoxy group-containing monomer or oligomer such as glycidylated polyester, glycidylated polyurethane, and glycidylated acryl, and the like. These epoxy-based resins may be used alone or in combination of two or more thereof.

Examples of the vinyl ester-based resin include (also called an epoxy acrylate-based resin), a resin, which is obtained by esterifying an epoxy compound as a raw material using acrylic acid or methacrylic acid, and subjecting the reaction product to addition polymerization of a polymerizable monomer. As for the epoxy compound as a raw material, a novolac-type epoxy compound, a bisphenol A-type epoxy compound, and the like are used, and a vinyl ester resin produced from a bisphenol A-type epoxy compound is suitably used from the viewpoint of obtaining high strength.

[Thermosetting Resin Layer]

In the composite particles of the present invention, a large number of reinforcing fibers adhere to the surface of thermoplastic resin expanded beads via a thermosetting resin being in an uncured state. Through such a configuration, when a mold is filled with the composite particles, it is possible to prevent the composite particles from sticking to each other, and thus, the mold and the like may be easily filled with the composite particles when molded. Thus, it is possible to freely set the shape of a final molded product. Also, it is preferable that the above thermosetting resin further contains the reinforcing fibers therein, from the viewpoint of strength improvement of the composite particles. In particular, it is preferable that the reinforcing fibers in the thermosetting resin exist buried in the thermosetting resin.

Also, the thermosetting resin being in an uncured state, which covers the surface of the thermoplastic resin expanded beads, and the reinforcing fibers adhering to the thermosetting resin are also collectively referred to as a "thermosetting resin layer." Specifically, the thermosetting resin layer functions as a fiber reinforced plastic (FRP) layer reinforced with the reinforcing fibers when the thermosetting resin is cured. In the composite particles of the present invention, the thermosetting resin layer covers the surface of the expanded beads.

In the thermosetting resin layer covering the expanded beads, it is preferable that more reinforcing fibers exist on the outer surface side of the thermosetting resin layer than on the central portion of the thermosetting resin layer in the thickness direction. In this case, in the thermosetting resin layer, an inclined structure of the reinforcing fibers is formed in which the content of the reinforcing fibers increases toward the outer surface.

Also, the thermosetting resin constituting the thermosetting resin layer covers the surface of the expanded beads, and is preferably in an A stage state as a substantially uncured state, or a state generally called a "B stage" which refers to a solid state or a semi-solid state at room temperature (hereinafter also referred to as a "B stage product" or a "B stage material"). Also, from the viewpoint of handling, it is preferable that the thermosetting resin constituting the thermosetting resin layer is in a B stage state.

Also, in the composite particles of the present invention, since the above described inclined structure by the reinforcing fibers is formed in the thermosetting resin layer, the fluidity of the composite particles is improved. Also, it is preferable that on at least a part of the outer surface of the thermosetting resin layer, unevenness is formed by the reinforcing fibers exposed on the outer surface. Due to such an unevenness structure, it is possible to further prevent the composite particles from sticking to each other.

From the similar viewpoint, it is preferable that on the outer surface of the thermosetting resin layer, at least a part of the reinforcing fibers is exposed. Since the reinforcing fibers are exposed on the outer surface of the thermosetting resin layer, it is possible to more efficiently prevent the composite particles from sticking to each other. Also, a part of each reinforcing fiber only has to be exposed from the outer surface of the thermosetting resin layer.

The thermosetting resin layer preferably contains a curing agent that is capable of generating a cured product by reacting with the thermosetting resin. The curing agent is not particularly limited as long as it is capable of generating a cured product by curing through reaction with the thermosetting resin. Examples of the curing agent of an epoxy resin include an acid anhydride such as methylhexahydrophthalic anhydride, a phenolic resin such as a novolac-type phenolic resin, a cresol novolac-type epoxy resin, a phthalic anhydride derivative, dicyandiamide, an imidazole compound, aluminum chelate, an amine complex of Lewis acid such as $BF_3$, and the like. These are used alone or as a mixture of two or more thereof.

When an unsaturated polyester-based resin is used as the thermosetting resin, it is preferable to use peroxide as the curing agent (the polymerization initiator). As for the peroxide, organic peroxide such as benzoyl peroxide, lauroyl peroxide, methyl ethyl ketone peroxide, peroxy perbenzoate, peroxy ketal, and dicumyl peroxide is preferably used. These peroxides are used alone or as a mixture of two or more thereof. A chain transfer agent may be used in addition to peroxide.

The lower limit of the addition amount of the curing agent is preferably 0.1 parts by weight or more, and more preferably 0.3 parts by weight or more, based on 100 parts by weight of the thermosetting resin from the viewpoint of efficiently curing the thermosetting resin. Then, the upper limit of the addition amount of the curing agent is preferably 20 parts by weight or less, and more preferably 10 parts by weight or less.

The thermosetting resin layer may contain a modifier such as an extender, a colorant, an ultraviolet absorber, an antioxidant, a flame retardant, an antifungal agent, a plasticizer, a coupling agent, an electrically conductive filler, a magnetic filler, a thermally conductive filler, an antistatic agent, or elastic fine particles, as necessary within a range in which an object of the present invention is not impaired. In particular, it is preferable to contain a flame retardant in order to obtain flame retardancy.

In particular, the composite particle of the present invention exists as an individual particle in which the thermosetting resin layer including the reinforcing fibers and the thermosetting resin being in an uncured state is formed on the surface of the thermoplastic resin-expanded bead. In contrast, a conventional composite of expanded beads, a thermosetting resin, and reinforcing fibers is formed as an aggregate, and the fluidity of composite particles is insufficient. For example, the angle of repose of the composite particles in a gradient method is preferably 30 to 60°, and more preferably 35 to 55°. For the measurement of the above angle of repose, for example, a repose angle measuring instrument of a three wheeler revolving cylinder method (manufactured by Tsutsui Scientific Instruments Co., Ltd.) is used for measuring.

The lower limit of the average particle size of the composite particles is preferably 1 mm or more, and more preferably 2 mm or more from the viewpoint of freely setting the shape of a final molded product by filling a mold with the composite particles. Then, the upper limit of the average particle size of the composite particles is preferably 10 mm or less, more preferably 6 mm or less, and further preferably 5 mm or less. The average particle size of the composite particles is measured by a method described in Examples to be described below.

The lower limit of the thickness of the thermosetting resin layer in the composite particles is preferably 4 µm or more, more preferably 20 µm or more, and further preferably 100 µm or more from the viewpoint of mechanical strength and foaming moldability. Then, the upper limit of the thickness of the thermosetting resin layer in the composite particles is preferably 1000 µm or less, more preferably 800 µm or less, and further preferably 300 µm or less. The thickness of the thermosetting resin layer is measured by a method described in Examples to be described below.

Also, it is preferable that the ratio of the thickness of the thermosetting resin layer to the average particle size of the composite particles is 0.01 to 0.2. Within the above range, the thermosetting resin layer does not fall off while the thermosetting resin layer is laminated on the surface of the composite particles so that satisfactory composite particles may be formed. From the above viewpoint, the ratio is preferably 0.015 to 0.15, and more preferably 0.02 to 0.1.

The lower limit of the bulk density of the composite particles is preferably 30 $kg/m^3$ or more, more preferably 45 $kg/m^3$ or more, and further preferably 60 $kg/m^3$ or more. Then, the upper limit of the bulk density of the composite particles is preferably 700 $kg/m^3$ or less, more preferably 500 $kg/m^3$ or less, and further preferably 300 $kg/m^3$ or less. Within the above range, the composite particles are excellent in lightness and also excellent in strength. The bulk density of the composite particles is measured by a method described in Examples to be described below.

Also, the lower limit of the apparent density of the composite particles is preferably 50 $kg/m^3$ or more, and more preferably 80 $kg/m^3$ or more. Then, the upper limit of the apparent density of the composite particles is preferably 700 $kg/m^3$ or less, and further preferably 500 $kg/m^3$ or less.

(Content of Reinforcing Fibers Per Composite Particle)

In the composite particles of the present invention, the content of reinforcing fibers is preferably 0.2 mg to 10 mg per composite particle. Within the above range, the fluidity of the composite particles is improved and the strength of a cured product obtained from the composite particles is excellent. From the above viewpoint, the content is preferably 0.5 mg to 8 mg, and more preferably 1 mg to 5 mg.

(Composition of Composite Particles)

In the composite particles of the present invention, the ratio of the weight of a thermosetting resin layer to the weight X of expanded beads is preferably 0.3 to 8. The ratio is more preferably 0.5 to 7, and further preferably 1 to 6. Within the above range, the composite particles have an excellent balance between the expanded bead portion and the thermosetting resin layer portion, and thus a more uniform thermosetting resin layer may be formed on the surface of the expanded beads.

Also, in the composite particles of the present invention, the ratio Y/X of the weight Y of the covering thermosetting resin to the weight X of the expanded beads is preferably 0.3 to 3. The ratio is more preferably 0.5 to 2.5, and further preferably 0.6 to 2. Also, in the composite particles of the present invention, the ratio Z/X of the weight Z of reinforcing fibers to the weight X of the expanded beads is preferably 0.1 to 8, more preferably 0.2 to 5, and further preferably 0.5 to 3. Within the above range, even when becoming a cured product, the composite particles are more excellent in strength because falling-off of the reinforcing fibers from the expanded beads is less likely to occur.

<<Method for Producing Composite Particles>>

The composite particles of the present invention may be produced by, for example, a production method including the following steps (1) and (2). Specifically, the step (1) is a step of mixing thermoplastic resin expanded beads with a thermosetting resin being in an uncured state so as to form a covered product in which the expanded beads are covered with the thermosetting resin being in an uncured state. Also, the step (2) is a step of causing reinforcing fibers to adhere to the thermosetting resin covering the expanded beads by mixing the covered product with the reinforcing fibers, so that a thermosetting resin layer including the reinforcing fibers and the thermosetting resin being in an uncured state is formed on the surface of the expanded beads. Hereinafter, each step will be described in detail.

In the step (1), first, the thermosetting resin is mixed with a curing agent (a polymerization initiator) by stirring or the like so as to prepare a thermosetting resin mixture in which the thermosetting resin and the curing agent (the polymerization initiator) are uniformly dispersed.

Next, the expanded beads are mixed with the thermosetting resin mixture, or the expanded beads are coated with the thermosetting resin mixture. Then, the covered product is formed in which the surface of the expanded beads is covered (coated) with the thermosetting resin mixture. Also, it is preferable that the mixing of the expanded beads with the thermosetting resin mixture is performed by using a batch type mixer such as a Ploughshare mixer or a Henschel mixer, or a continuous mixer such as a mono pump or a screw pump such that a mixing motion is not accompanied by cutting, destruction, etc. of the expanded beads. Also, in a case where it is desired to further improve the strength of the composite particles, or the like, the thermosetting resin contains reinforcing fibers.

In the step (2), the covered product obtained in the step (1) is mixed with the reinforcing fibers. In the covered product obtained in the step (1), the thermosetting resin mixture covering the surface of the expanded beads is in an uncured state. Therefore, when the covered product is mixed with the reinforcing fibers, the reinforcing fibers adhere to the thermosetting resin mixture covering the surface of the expanded beads. Then, the thermosetting resin layer particularly containing a large number of reinforcing fibers is formed on the outer surface side of the composite particles.

Also, the present invention may include a step in which the expanded beads are covered with the thermosetting resin mixture including the reinforcing fibers, but preferably does not include a step in which the expanded beads are covered with the thermosetting resin mixture including the reinforcing fibers from the viewpoint of fluidity improvement of the composite particles. Also, in the present invention, it is preferable that after the covered product of the expanded beads covered with the thermosetting resin mixture is formed, the reinforcing fibers adhere to the covered product in a subsequent step. In this manner, it is possible to unevenly distribute the reinforcing fibers on the outermost surface of the composite particles. Then, the fluidity of the composite particles is further improved.

Also, it is preferable that the composite particles of the present invention are finally formed such that a large number of reinforcing fibers are contained on the outermost surface of the composite particles. For example, it is preferable that the step (1) and the step (2) are repeated, and finally, the composite particles are formed through the step (2). As the step (1) and the step (2) are repeated, in the thermosetting resin layer, more reinforcing fibers exist on the outer surface side of the resin layer than on the central portion of the resin layer in the thickness direction, and also, the content of the reinforcing fibers contained in the composite particles becomes adjustable.

<<Composite Particle Cured Product>>

A composite particle cured product of the present invention is obtained by curing a thermosetting resin layer constituting the composite particles.

The composite particle cured product is produced by curing a thermosetting resin included in the thermosetting resin layer of the composite particles of the present invention, through heating or the like. This composite particle cured product has a structure in which the surface of expanded beads is covered with a thermosetting resin cured product obtained by curing the thermosetting resin layer, and also, the thermosetting resin cured product is reinforced with reinforcing fibers. Therefore, the composite particle cured product becomes particles excellent in strength despite its lightness. Such a composite particle cured product may be produced by composite particles having a property of excellent fluidity in which sticking between the composite particles is prevented, as in the present invention. Specifically, by the composite particles as a starting material, the composite particle cured product may be formed through heating at 80° C. to 450° C., preferably through heating at 100° C. to 150° C., in an environment where the composite particles are not close to each other, and then the composite particles do not stick to each other.

The composite particle cured product of the present invention is particularly excellent in heat resistance and pressure resistance. For example, the composite particle cured product may be used as a core material of a molded article that is molded with resin injection at a comparative high pressure.

Also, a thermosetting resin may be further added to the produced composite particle cured product so that composite particle cured products are bonded to each other, whereby a molded product of the composite particle cured products is obtained.

Also, a carbon fiber composite material is molded by a molding method such as, for example, high cycle HP-RTM molding, PCM (prepreg compression molding) molding, or injection molding. In high cycle molding such as HP-RTM molding, in some cases, a resin injection temperature is a high temperature of 100° C. or more, and a molding resin pressure is a high pressure of 6 to 7 MPa. The composite particle cured product of the present invention, as a foaming core material for the carbon fiber composite material, has a strength (heat resistance and pressure resistance) to withstand a molding temperature and a molding pressure in the above high cycle molding.

<<In-Mold Molded Article of Composite Particles (Preform)>>

An in-mold molded article of the composite particles of the present invention is an in-mold molded article of composite particles.

That is, the in-mold molded article of the composite particles is a composite particle-molded article obtained by filling a mold with a plurality of composite particles, and performing in-mold molding. Then, the in-mold molded article of the composite particles is formed as starting material from composite particles in which the thermosetting resin layer is in an uncured state or a semi-cured state. The thermosetting resin layer constituting the in-mold molded article of the composite particles (hereinafter, also referred to as a "composite particle-molded article," a "preform" or a "preform molded article") is in an uncured state or a semi-cured state, and the composite particles constituting the in-mold molded article are bonded to each other. Specifically, after the openable and sealable mold is filled with a plurality of composite particles being in an uncured state the mold is closed with a certain gap. Then, the inside of the mold is pressurized, and the composite particles are heated to such an extent that a thermosetting resin is not completely cured, so that a preform in which the composite particles are bonded to each other is molded (cracking molding). Such a preform has a gap between the composite particles constituting the preform. Also, in the composite particle-molded article obtained by bonding the composite particles, as compared to in a conventional reinforcing fiber-composite molded article, reinforcing fibers are dispersed uniformly at a high concentration within the molded article. Thus, the obtained composite particle-molded article is excellent in strength.

Also, as the composite particles are completely cured through heating, the preform becomes the molded article made of a composite particle cured product.

Also, in bonding of adjacent composite particles, the above described method of bonding through heat-transfer heating, a method of bonding through heating with a heating medium such as steam, or a method of bonding using an adhesive may be exemplified. In particular, it is preferable to perform a method of heating and bonding using the thermosetting resin (being in an uncured state or a semi-cured state) adhering to the composite particles, or the like. Also, it is preferable to obtain the composite particle-molded article by combining the above method with a method of pressurization or compression using a mold.

Specifically, when the preform is molded, the volume in a mold filled with the composite particles is preferably 1.01 times to 2.0 times, and more preferably 1.05 times to 1.8 times the volume of the preform molded article. Then, at the time of molding, the composite particles within the mold are compressed to a target molded article size, and the thermosetting resin layer is semi-cured by heating. Then, the composite particles are fused together to form the preform molded article. Therefore, within the above range, it is possible to obtain the composite particle-molded article faithfully reproducing a mold shape while the composite particles constituting the composite particle-molded article are less likely to be crushed into a flat shape, and thus there is no concern that anisotropy of the physical property of the molded article after complete curing may occur.

At heating at the time of molding of the composite particles, the space temperature within the mold is preferably 40° C. to 200° C., and more preferably 80° C. to 150° C. When the space temperature within the mold is 40° C. or more, it is easy to uniformly increase the space temperature within the mold at a certain timing. Also, when the space temperature within the mold is 200° C. or less, it is possible to suppress energy loss in production, and to suppress the scale of ancillary facilities for uniform heating. Also, a heating time is preferably for 10 sec to 30 min, and more preferably for 1 min to 20 min. Within the above range, the composite particles may be uniformly heated, and thus the composite particle-molded article is excellent in strength uniformity, voidage uniformity, etc.

The voidage of the composite particle-molded article is preferably 3% by volume to 40% by volume, and more preferably 5% by volume to 30% by volume from the viewpoint of impregnation of the thermosetting resin when a composite to be described below is produced. When the voidage of the composite particle-molded article increases, an impregnation amount of the thermosetting resin forming the composite increases, and the strength of the composite to be described below is further increased. Meanwhile, when the voidage of the composite particle-molded article decreases, an impregnation amount of the thermosetting resin forming the composite is suppressed, and the heat resistance of the composite is improved.

When an amount of the composite particles for filling at the time of molding is measured in the filling, the voidage of the composite particle-molded article is controlled. Also, instead of measuring the composite particles in advance, it is possible to control the volume of a mold space by controlling the amount of cracking of a mold by using the mold provided with a cracking mechanism in advance. Then, it is possible to easily control the voidage by fully filling the set mold space with the composite particles. Also, the above voidage is calculated by the following equation when the voidage is X, the apparent volume is Y, and the true volume excluding a void portion in the composite particle-molded article is Z (the true volume Z may be found by measuring a volume increased when the composite particle-molded article is submerged in a liquid such as alcohol).

$$X[\%]=[(Y-Z)/Y]\times 100$$

The shape of the composite particle-molded article is not particularly limited. As described above, in the composite particles of the present invention, the reinforcing fibers adhere to the surface of thermoplastic resin expanded beads via the thermosetting resin being in an uncured state. Thus, when the inside of a mold is filled with the composite particles, the composite particles hardly stick to each other, and thus the degree of freedom of a molding shape is high. Therefore, the shape of the composite particle-molded article is not limited to a general rectangular body such as a plate shape or a block shape, but may take various shapes suitable for the use, purpose, etc. of a final product.

The molded article density of the composite particle-molded article is preferably 50 to 300 kg/m$^3$. Within the above range, in particular, lightness becomes excellent. From the above viewpoint, the molded article density is more preferably 100 to 250 kg/m$^3$, and further preferably 120 to 200 kg/m$^3$.

Also, it is thought that the composite particles are bonded by a mechanism in which an uncured thermosetting resin having a thixotropic property, in an A stage or a B stage state, flows by heating and compression at the time of preform molding and then comes in contact with a thermosetting resin of the adjacent composite particles.

Also, after the preform is produced, it is preferable that the preform is stored in an environment in which the temperature and the humidity are appropriately managed. When the preform is stored under a high temperature environment, there is a concern that a B stage state-resin remaining in the preform may be cured. The storage temperature is preferably −100° C. to 80° C., and further preferably −30° C. to 40° C. Within the above range, the preform does not undergo low-temperature embrittlement, and there is no concern that the B stage state-resin may be cured. Also, the humidity, as a relative humidity, is preferably 80% or less and preferably 50% or less. It is known that an environment within the above range is preferable for storing a resin product such as a preform, and there is no particular problem in the product quality.

<<Laminate>>

In a laminate of the present invention, a reinforcing fiber-sheet material is laminated and bonded on at least a part of the surface of a composite particle-molded article obtained by bonding composite particles to each other in which reinforcing fibers adhere to the surface of thermoplastic resin expanded beads via a thermosetting resin being in an uncured state (also, the above laminate is also referred to as a "composite preform" or a "laminate molded article"). Also, it is preferable that the composite particle-molded article has interconnected voids between the composite particles.

That is, the laminate of the present invention has the composite particle-molded article in which the above described composite particles in the present invention are bonded to each other, and the reinforcing fiber-sheet material. The reinforcing fiber-sheet material is laminated and bonded on at least a part of the surface of the composite particle-molded article. Also, the composite particle-molded article included in the laminate of the present invention has interconnected voids between the composite particles. Also, as described above, the composite particle-molded article is obtained by bonding the composite particles to each other in which adhesion of the reinforcing fibers is made via the thermosetting resin being in an uncured state, and the thermosetting resin constituting the composite particles may be in an uncured state or a cured state.

<<Production Method of Laminate>>

A production method of the laminate of the present invention is a production method of a laminate, in which a reinforcing fiber-sheet material is laminated on at least a part of the surface of a molded article of composite particles in which reinforcing fibers adhere to the surface of thermoplastic resin expanded beads via a thermosetting resin being in an uncured state, and there are a first production method and a second production method.

The first production method is a production method of a laminate, which includes a step of filling the inside of a mold with composite particles in which reinforcing fibers adhere to the surface of thermoplastic resin expanded beads via a thermosetting resin being in an uncured state, and obtaining a composite particle-molded article having interconnected voids between the composite particles by mutual bonding through heating (a composite particle-molded article producing step), and a step of laminating and bonding a reinforcing fiber-sheet material on at least a part of the surface of the composite particle-molded article (a reinforcing fiber-sheet material bonding step).

The second production method is a production method of a laminate, which includes a step of disposing a reinforcing fiber-sheet material within a mold while filling the inside of the mold with composite particles in which reinforcing fibers adhere to the surface of thermoplastic resin expanded beads via a thermosetting resin being in an uncured state (a simultaneous filling step), and a step of bonding the composite particles to each other through heating of the composite particles and the reinforcing fiber-sheet material to obtain a composite particle-molded article having interconnected voids between the composite particles, while bonding the composite particles to the reinforcing fiber-sheet material so that a laminate is molded in which the reinforcing fiber-sheet material is laminated on at least a part of the surface of the composite particle-molded article (a simultaneous bonding step).

Hereinafter, unless otherwise specified, "the production method of the laminate of the present invention" includes the first production method and the second production method.

<First Production Method>

In the composite particle-molded article producing step in the first production method, through in-mold molding of the above described composite particles, a composite particle-molded article is obtained.

The composite particle-molded article is produced by, for example, cracking molding. Such a composite particle-molded article has a gap present between the composite particles. Also, it is preferable that the composite particle-molded article, as an in-mold molded article, is a molded article obtained by filling a mold with the composite particles and performing molding.

<Reinforcing Fiber-Sheet Material Bonding Step>

In the reinforcing fiber-sheet material bonding step in the first production method, a reinforcing fiber-sheet material is laminated and bonded on at least a part of the surface of the composite particle-molded article.

Through the above step, it is possible to produce a laminate from which a composite that is lightweight and excellent in strength is obtained.

Also, it is possible to obtain a composite that is lightweight and high in strength by injecting a thermosetting resin into voids included in the composite particle-molded article, and then curing the thermosetting resin in the voids and curing the thermosetting resin layer. In this case, the laminate functions as a precursor of the composite (hereinafter, also referred to as a "composite preform").

The bonding position of the reinforcing fiber-sheet material is not particularly limited as long as it is a surface of the composite particle-molded article. For example, when the shape of the composite particle-molded article is a flat plate, one surface or both surfaces of the flat plate may be employed. Also, in obtaining the composite, in order to easily impregnate the voids of the laminate with the thermosetting resin, the reinforcing fiber-sheet material may be laminated and bonded on the laminate such that the reinforcing fiber sheet material does not cover the entire surface of the composite particle-molded article. When the shape of the composite particle-molded article is a flat plate, from the viewpoint of productivity, it is preferable that the reinforcing fiber-sheet material is laminated on one surface of the composite particle-molded article.

In the first production method, when the reinforcing fiber-sheet material bonding step is performed after the composite particle-molded article producing step, the reinforcing fiber-sheet material only has to be laminated on the surface of the composite particle-molded article. For example, by applying a tackifier or an adhesive to the composite particle-molded article, the reinforcing fiber-sheet material may be bonded to the composite particle-molded article. Also, the composite particle-molded article and the reinforcing fiber-sheet material may be pressure-bonded by a hot press machine, etc.

Also, if a thermosetting resin layer of composite particles constituting the composite particle-molded article is in a semi-cured state, when the reinforcing fiber-sheet material is disposed on the composite particle-molded article and is compressed, the composite particle-molded article is bonded to the reinforcing fiber-sheet material by the thermosetting resin seeping onto the surface of the composite particles.

When the reinforcing fiber-sheet material is laminated on the composite particle-molded article, in a case where, for example, a laminate in a rectangular parallelepiped shape is obtained, a mold that opens/closes in the vertical direction is used. Then, when a concave mold is set as a bottom surface, it is preferable to lay the reinforcing fiber-sheet material on the bottom surface of a mold. Also, the reinforcing fiber-sheet material may be laid so as to cover the side surface portion of the rectangular parallelepiped. Then, in the first production method, the composite particle-molded article is disposed on the reinforcing fiber-sheet material and is molded. Meanwhile, in the second production method, the concave mold is filled with the composite particles.

Then, after the mold is closed, the mold temperature ranges from 30 to 150° C. through a temperature rise from an initial temperature, and molding is performed by applying a press pressure of 0.01 to 5 MPa. After heating and compression for 1 to 60 min in the above condition, the mold is opened, and the laminate is taken out to obtain the laminate.

Here, after the inner surface of the mold is heated to an arbitrary temperature of 30 to 150° C. in advance, molding may be performed by filling with the composite particles. The molding aims at facilitating bonding between the composite particles. However, the bonding between the composite particles is achieved by an effect that an uncured resin provided by coating obtains fluidity by a temperature increase. Also, it may be thought that such achievement is made by an effect that fluidity is obtained by change of a press pressure between the composite particles, and a bonding property via a thermosetting resin layer containing reinforcing fibers on the surface layer of the composite particles is improved.

Also, it is preferable that when laminated on the composite particle-molded article having a curved surface, the reinforcing fiber-sheet material is cut into a shape conforming to the curved surface in advance.

Also, in the production method of the laminate of the present invention, the composite particle-molded article producing step and the reinforcing fiber-sheet material bonding step may be performed separately from each other, or may be simultaneously performed by using the same mold.

From the viewpoint of increasing productivity, the composite particle-molded article producing step, and the reinforcing fiber-sheet material bonding step may be performed simultaneously.

Since the second production method includes the simultaneous filling step, and the simultaneous bonding step, production of a composite particle-molded article, and bonding of a reinforcing fiber-sheet material to the composite particle-molded article are simultaneously performed.

Specifically, in the simultaneous filling step, a reinforcing fiber-sheet material is disposed within a mold, while the mold is filled with composite particles, in which reinforcing fibers adhere to the surface of thermoplastic resin expanded beads via a thermosetting resin being in an uncured state. Also, in the simultaneous bonding step, the composite particles are bonded to each other through heating of the composite particles and the reinforcing fiber-sheet material within the mold to obtain a composite particle-molded article having interconnected voids between the composite particles, while the composite particles are bonded to the reinforcing fiber-sheet material so that a laminate is molded, in which the reinforcing fiber-sheet material is laminated on at least a part of the surface of the composite particle-molded article.

For example, the reinforcing fiber-sheet material is laid in advance within a concave mold of the mold for obtaining the composite particle-molded article, and the composite particles are filled on the reinforcing fiber-sheet material. Then, as the inside of the mold is heated, the composite particles are bonded to each other so that the composite particle-molded article is molded, while bonding of the reinforcing fiber-sheet material to the composite particle-molded article is performed.

Molding conditions in the simultaneous filling step and the simultaneous bonding step of the second production method are the same as those in the composite particle-molded article producing step of the first production method.

As described above, in the composite particle-molded article producing step, the uncured thermosetting resin (in a B stage state) constituting the composite particles flows by heating and compression at the time of molding of the composite particle-molded article, seeps onto the surface of the composite particles, and then comes in contact with a thermosetting resin of the adjacent composite particles, so that the composite particles are bonded to each other.

Meanwhile, in the simultaneous bonding step as well, the uncured thermosetting resin (in a B stage state) constituting the composite particles flows by heating and compression of the composite particles and the reinforcing fiber-sheet material, seeps onto the surface of the composite particles, and then the seeping thermosetting resin comes in contact with a thermosetting resin of the adjacent composite particles, so that the composite particles are bonded to each other. In the simultaneous bonding step, it is thought that the composite particles are bonded to each other while the reinforcing fiber-sheet material in contact with the composite particles may be firmly bonded to the composite particles by the thermosetting resin presents on the surface of the composite particles.

[Reinforcing Fiber-Sheet Material]

Examples of a reinforcing fiber-sheet material used in the reinforcing fiber-sheet material bonding step include a fabric using reinforcing fibers, a non-woven fabric sheet of reinforcing fibers, roving fibers of reinforcing fibers, a chopped strand mat, and the like. Examples of the type of the reinforcing fiber used for the reinforcing fiber-sheet material include a glass fiber, a carbon fiber, a vinylon fiber, a polyester fiber, a ceramics fiber, a steel fiber, a stainless (SUS) fiber, an aluminum fiber, a boron fiber and a combination of two or more of these. Among these, from the viewpoint of high strength, versatility, economic efficiency, etc., it is particularly preferable that the reinforcing fiber used for the reinforcing fiber-sheet material includes a glass fiber, a carbon fiber, or a vinylon fiber.

The type of reinforcing fibers contained in composite particles, and the type of reinforcing fibers of the reinforcing fiber-sheet material bonded to a composite particle-molded article may be the same or different.

The reinforcing fiber-sheet material may be a sheet material including reinforcing fibers or may be a sheet material in which reinforcing fibers are mixed with fibers other than the above reinforcing fibers, but is preferably a sheet material including the reinforcing fibers from the viewpoint of increasing the strength of a composite. Also, measurement may also be performed on the reinforcing fibers of the reinforcing fiber-sheet material, similarly to the reinforcing fibers used for the composite particles.

The reinforcing fiber-sheet material may be a fabric woven with roving or continuous fibers. The fabric is generally provided by a plain weave, a twill weave, etc. using weft yarns and warp yarns. Also, a knitted fabric represented by knit may be employed. The weight per unit area of the reinforcing fiber-sheet material is important as a factor controlling the strength of the composite, and it is preferable to use a reinforcing fiber-sheet material of 20 g/m$^2$ to 1200 g/m$^2$ regardless of the shape of a fabric, a knitted fabric, a non-woven fabric, etc. Further, the weight per unit area of the reinforcing fiber-sheet material is more preferably 100 g/m$^2$ to 1000 g/m$^2$, and further preferably 150 g/m$^2$ to 600 g/m$^2$. Also, a plurality of stacked reinforcing fiber-sheet materials may be used. The reason the plurality of stacked multi-layered reinforcing fiber-sheet materials is used as the reinforcing fiber-sheet material is that flexibility is particularly required in a case of conforming to a curved surface or the like of a molded product. Further, a chopped strand mat having a non-woven fabric structure may be employed but in selecting a sheet material, selections are made according to a required performance of a final product, a processing performance, a compatibility with a resin to be used, and a cost.

As for the reinforcing fiber-sheet material, a commercially available product may be used, and for example, a chopped strand mat (CSM) #450 (manufactured by Central Glass Co., Ltd., product name "ECM450-501") as a reinforcing fiber-sheet material of glass fibers (GF); "Torayca cloth C06343" (product name, manufactured by Toray Co., Ltd.) as a reinforcing fiber-sheet material of carbon fibers (CF), or the like is used.

The laminate production method of the present invention may include a step of heating and curing a thermosetting resin being in an uncured state.

The step may be performed when a composite particle-molded article is obtained; or before a reinforcing fiber-sheet material is laminated and bonded on a composite particle-molded article even after the composite particle-molded article is obtained, and also may be performed after a laminate is produced by laminating and bonding a reinforcing fiber-sheet material on a composite particle-molded article.

The step of heating and curing the thermosetting resin being in an uncured state only has to be performed at 80° C. to 450° C., and is more preferably performed at 100° C. to 150° C. As the thermosetting resin being in an uncured state is completely heated and cured and then is placed in a C stage state, bonding between composite particles bonded by point-bonding may become strong, thereby increasing the rigidity of the laminate. Also, the "C stage state" is defined in JIS K6900-1994.

Also, when a thermosetting resin layer is cured before a composite is molded, heat resistance and pressure resistance are excellent, and thus, it is possible to withstand a molding temperature and a molding pressure in high cycle molding such as HP-RTM molding.

<<Package>>

A package of the present invention is obtained when the composite particle-molded article or the laminate of the present invention is covered with a thermoplastic resin film, and is packaged under reduced pressure.

Since the composite particle-molded article or the laminate is covered with the thermoplastic resin film and is packaged under reduced pressure, even when composite particles of the composite particle-molded article or composite particles of the composite particle-molded article constituting the laminate are point-bonded to each other via a thermosetting resin being in an uncured state, it is possible to prevent the composite particle-molded article or the laminate from being out of shape due to impact, etc. during transportation.

Examples of the thermoplastic resin film that covers the composite particle-molded article or the laminate include a film of a polyester-based resin, a polycarbonate-based resin, an acrylic resin, a polyphenylene ether-based resin, a polymethacrylimide resin, a polyolefin-based resin, a polystyrene-based resin, a polyamide-based resin or the like. It is preferable that the film to be used has a certain degree of gas barrier property, and a certain degree of heat sealing property so that sealing may be simply performed.

A certain degree of gas barrier property refers to having a property of maintaining the degree of vacuum of the package lower than a normal pressure for at least one day or more, and it is preferable to have a property of maintaining the degree of vacuum within the package preferably for six months or more. Heat sealing is an intermolecular bonding technique using the thermal reversibility of a thermoplastic plastic, and it is preferable to perform heating suitable for a heat sealant (a welding layer) in order to complete the heat sealing.

A certain degree of heat sealing property refers to having a characteristic in which meltability by heating at an appropriate and low temperature and work completion in a short time may be achieved, and uniform heating may be achieved. Among the above, from the viewpoint of film strength and gas barrier, it is preferable that the thermoplastic resin film is a barrier film of a polyethylene/nylon multi-layer and a polyethylene/PVOH multi-layer. A heat sealing principle is not particularly limited as long as there are uniformity and long durability, but from the viewpoint of convenience, an impulse sealer, a heat bar sealer or the like is used. In order to secure easy bonding of bonding layers, a hot-melt adhesive or the like that assists heat sealing, as an add layer, may be used in combination.

The package of the present invention is obtained when, for example, the composite particle-molded article or the laminate of the present invention is accommodated in an outer package obtained by molding a thermoplastic resin film into a bag shape, is packaged under reduced pressure, and sealed. In the packaging under reduced pressure, the inside pressure is preferably reduced to $4.00 \times 10^4$ Pa or less, and the pressure is more preferably reduced to $1.33 \times 10^4$ Pa or less.

<<Composite (Resin Composite)>>

The composite of the present invention uses the composite particle-molded article of the present invention, as a core material of an FRP molded article using a thermosetting resin, and is obtained by filling voids of the composite particle-molded article with the thermosetting resin, and performing curing.

Also, in a preform including composite particles, reinforcing fibers are present on the surface of each of the composite particles, and the composite particles are bonded to each other so as to form the preform. Therefore, the reinforcing fibers are uniformly present throughout the preform. In the composite that such a preform is filled with a thermosetting resin and is cured, the reinforcing fibers are uniformly dispersed in the composite. Therefore, the composite of the present invention, as the FRP molded article, becomes particularly excellent in rigidity as compared to that in a related art.

When the preform of the present invention is used in FRP molding, for example, a composite may be produced as follows. After the preform that is molded as described above is placed within a mold, the inside of the mold is filled with a thermosetting resin mixture obtained by mixing a thermosetting resin with a curing agent. Here, even inside of voids formed in the preform is impregnated with the thermosetting resin mixture. Then, the composite is obtained by heating the mold and curing the thermosetting resin.

In the preform, the voidage value of a preform molded article is preferably 3% by volume to 40% by volume, and more preferably 5% by volume to 30% by volume from the viewpoint of impregnation of a thermosetting resin.

Also, in the heating temperature at the time of forming of the above composite, the space temperature within the mold is preferably 40° C. to 300° C., and more preferably 80° C. to 150° C. At 40° C. or less, there is a concern that it is difficult to uniformly increase the space temperature within the mold at a certain timing. Also, in excess of 300° C., there is a concern that energy loss is likely to be increased in production, and the scale of ancillary facilities for uniform heating increases. When the composite is formed, the heating time is preferably 10 sec to 30 min, and more preferably 1 min to 20 min. Within the above range, composite particles may be uniformly heated, and thus the preform is excellent in uniformity.

In particular, in the composite particles of the present invention, as described above, by compression and heating within the mold, the composite particles, which were present independently from each other at a point in time of charging into the mold, are bonded to form a preform as an integrally molded article. This preform is a molded article including the composite particles which have a thermosetting resin layer including reinforcing fibers on the surface of each expanded bead, and thus in the completed preform, the reinforcing fibers are three-dimensionally uniformly dispersed.

Also, it is preferable that the preform is in a B stage state or a C stage state. Then, when FRP molding is performed by using the preform, the FRP mold is simply completed by inserting the preform in a mold, and pouring a thermosetting resin mixture obtained by mixing a thermosetting resin with a curing agent, in the mold.

Also, the amount of the reinforcing fibers is arbitrarily adjustable by adjusting the amount of the reinforcing fibers present on the surface of the composite particles, and then by using the composite particles of the present invention, it is easy to allow the content of the reinforcing fibers contained in the preform to become a high content of 50% or more.

Also, by using a combination of two or more preforms having different characteristics, as a core material, it is possible to form a composite whose thickness is adjustable, with an inclined structure suitable for various uses. For example, in a composite particle-molded article, when a combination of composite particle-molded articles having different densities is used as a core material, strength may be maintained on one surface side of the composite, and different characteristics such as lightness and heat insulation may be exhibited on the other surface side.

Also, the composite of the present invention may use, as the core material, not only the above composite particle-molded article (the preform), but also a laminate of the preform and a reinforcing fiber-sheet material.

Since voids of the above laminate are filled with a thermosetting resin, and the thermosetting resin is included in the composite, it is possible to reduce the weight, and to increase the strength of the composite.

As described above, the strength of the composite depends on the voidage of the laminate (more specifically, the voidage of the composite particle-molded article included in the laminate). Then, as the voidage increases and the amount of the thermosetting resin filled into the voids increases, the strength increases. Meanwhile, when the voidage of the laminate is small, the weight ratio of the thermosetting resin in the composite is suppressed, and the heat resistance of the composite increases.

Therefore, when composites having the thermosetting resin in different filling amounts are combined in the thickness direction, it is possible to obtain a product in which gradient is given to the strength in the thickness direction.

As for the thermosetting resin, a thermosetting resin used when the above described composite particles are produced is used. For example, a resin composite may be obtained by injecting a thermosetting resin mixture described in the description in step (1) of the composite particle producing step, into the mold, impregnating a laminate with the thermosetting resin mixture, and performing curing at 80 to 450° C. for 30 to 180 min.

When this laminate is used in FRP molding, for example, a molded product (a composite) is produced as follows. After the laminate that is molded as described above is placed within a mold, the inside of the mold is filled with a thermosetting resin mixture obtained by mixing a thermosetting resin with a curing agent. Here, even inside of voids of a molded article formed in the laminate is impregnated with the thermosetting resin mixture. Then, the composite is obtained by heating the mold and curing the thermosetting resin. Through the above structure, a molded product having a higher rigidity may be obtained.

In the laminate using the composite particles of the present invention, reinforcing fibers are present on the surface of each composite particle, and the composite particles are bonded to each other so as to form the laminate. Therefore, the reinforcing fibers are uniformly present throughout the laminate. Also, the laminate may be formed by in-mold molding, and thus is excellent in that the degree of freedom of the shape is high, and thus application to various shapes is possible.

Also, in the composite of the present invention, for example, a plurality of laminates which are stacked such that reinforcing fiber-sheet materials are on the surface sides may be used as a core material. Then, the core material is impregnated with a thermosetting resin being in an uncured state, and then the composite is formed through solidification. Also, when the composite is formed by using, as a core material, two or more laminates which are disposed such that reinforcing fiber-sheet materials are on the surface sides, the composite in which all surfaces are covered with the reinforcing fiber-sheet materials is formed.

Conventionally, through one step, it was difficult to produce a core material in a shape in which a reinforcing fiber-sheet material covers top and bottom surfaces. In the present invention, when a core material is formed by a plurality of laminates which has reinforcing fiber-sheet materials bonded to one side surfaces and is stacked such that the reinforcing fiber-sheet materials are on the surface sides, it is possible to simplify a step of forming the composite.

EXAMPLES

Next, the present invention will be described by Examples in more detail, but the present invention is not limited by these examples at all.

<Method of Measuring Physical Properties of Raw Material Particles (Beads) and Composite Particles>

The bulk density of raw material particles, the bulk density of composite particles, the apparent density of the composite particles, the average particle size of the raw material particles, the average particle size of the composite particles, and the cured state of a thermosetting resin layer in the composite particles were determined as follows.

(Bulk Density of Raw Material Particles and Composite Particles)

For each of the raw material particles and the composite particles, after the particles were air-dried for 24 hours, the particles were filled a 1 L measuring cylinder up to the 1 L mark line position and were measured, and then the mass (unit: g) of the particles with a bulk volume of 1 L was weighed to the first decimal place. Then, the bulk density (unit: kg/m$^3$) was found by performing unit conversion.

(Apparent Density of Composite Particles)

The composite particles with a bulk volume of about 50 mL, in which the weight W (g) was weighed in advance, were submerged in a 200 mL measuring cylinder filled with 100 mL of water, by using a wire net, and the like, and then, a volume V (mL) corresponding to a rise of a water level was read. W/V was obtained, and unit conversion was performed so as to calculate the apparent density (kg/m$^3$) of the composite particles.

(Average Particle Size of Raw Material Particles and Composite Particles)

The raw material particles or the composite particles were observed with an optical microscope, and a long diameter and a short diameter of each particle were observed. For each, 100 particles were observed, and the average particle size of the particles was found as the average value of values measured as maximum outer dimensions of the particles.
(Thickness of Thermosetting Resin Layer)

The thickness of a thermosetting resin layer was calculated from (the average particle diameter of composite particles (B stage beads)–the average bead diameter of expanded beads as a raw material)/2. Also, for the above average particle (bead) diameter, the expanded beads and the composite particles in each sample were observed using a scanning electron microscope, and the long diameters were observed. In each sample, 50 particles (beads) were observed, and the average value of the long diameters was set as the average particle (bead) diameter.
(Cured State of Thermosetting Resin Layer of Composite Particles)

In a method of determining the uncured state of the thermosetting resin in the composite particles, in accordance with a heat flux differential scanning calorimetry method described in JIS K7122-1987, a DSC curve was obtained by increasing the temperature of 1 to 4 mg of the composite particles from 0° C. to 200° C. at a heating rate of 10° C./min. Here, a case where a curing heat generation peak derived from the thermosetting resin layer was checked was determined as an uncured state.
(Content of Reinforcing Fibers in Thermosetting Resin Layer)

After the composite particles were precisely weighed, the composite particles were cut into approximately two equal parts by a knife, etc. so that cross-sections were exposed. Then, the cut beads and 1,3-bis(aminomethyl)cyclohexane (product name "1,3-BAC" manufactured by Mitsubishi Gas Chemical Co., Ltd.) were put in a beaker (200 mL) made of PP, and were left for 12 hours at room temperature so as to dissolve a polylactic acid portion. After 12 hours, it was determined that a foamed layer of polylactic acid within the composite particles was dissolved. Then, the thermosetting resin layer remaining without being dissolved was taken out with tweezers, placed on a petri dish, and then washed with 1,3-bis(aminomethyl)cyclohexane twice. Also, the thermosetting resin layer was washed twice with acetone (manufactured by Kanto Chemical Co., Ltd., CICA first grade product), and dried under reduced pressure in a condition of 115° C. and 2 hours. Through the above method, the weight of the expanded beads portion was measured. Also, the content of reinforcing fibers of the thermosetting resin layer taken out after dried was measured by a method based on JIS K7075-1991 7-(2) (a nitric acid decomposition method). Through the above method, in the composite particles, the weight of the expanded beads and the weight of the thermosetting resin layer, and the weight of the reinforcing fibers in the thermosetting resin layer were calculated. The above operation was performed on measurement on 10 composite particles, and the average value was set as the content of the reinforcing fibers. Therefore, in the composite particles, the weight ratio of the expanded beads, the weight ratio of the thermosetting resin, and the weight ratio of the reinforcing fibers were calculated.

Also, when the expanded beads are made of a polyolefin-based resin, after a foamed layer of the polyolefin-based resin is dissolved in xylene of 140° C., the above method may be employed for the thermosetting resin layer so as to perform the same measurement.

<Components Used for Production>
1. Components Used for Producing Raw Material Particles (Beads)
(1) Polylactic Acid Resin PLA-1: crystalline polylactic acid resin, manufactured by Unitika Ltd. "TERRAMAC TP-4000E" (melting point: 163° C., MFR (190° C./2.16 kgf): 4.6 g/10 min, Vicat softening temperature: 157° C.)

PLA-2: low-crystalline polylactic acid resin, manufactured by Unitika Ltd. "TERRAMAC TP-4001E" (melting point: none, MFR (190° C./2.16 kgf): 6.0 g/10 min, Vicat softening temperature 58° C.)
2. Components Used for Producing Composite Particles
(1) Thermosetting Resin (r)

r1: bisphenol A-type epoxy resin, manufactured by DIC corporation, product name "Epicron 850," epoxy equivalent: 190 (g/eq.), described as "EP" in the table r2: unsaturated polyester resin, manufactured by Nippon Yupika Co., Ltd., product name "4007A," described as "UP" in the table
(2) Curing Agent (h)

h1: amine-based curing agent, manufactured by Mitsubishi Gas Chemical Co., Ltd., product name "1,3-BAC(1,3-bis(aminomethyl)cyclohexane)." active hydrogen equivalent: 35.6 (g/eq.)
(3) Reinforcing Fibers (f)

f1: carbon fibers (CF), manufactured by Zoltek, product name "RMF150," average fiber length (L): 150 μm, fiber diameter (D): 13 μm, L/D: 11.5 f2: glass fibers (GF), manufactured by Central Glass Co., Ltd., product name "Milled Fiber EFK80-31/T," average fiber length (L): 80 μm, fiber diameter (D): 13 μm, L/D: 6.2, described as "GF1" in the table f3: glass fibers (GF), manufactured by Central Glass Co., Ltd., product name "Milled Fiber EFH150." average fiber length (L): 150 μm, fiber diameter (D): 13 μm, L/D: 11, described as "GF2" in the table f4: glass fibers (GF), chopped strands, manufactured by Central Glass Co., Ltd., product name "ECS03-350," average fiber length (L): 3 mm, fiber diameter (D): 13 μm, L/D: 231, described as "GF" in the table
(4) Inorganic Filler (t)

t1: fumed silica, manufactured by Evonik Industries AG, product name "Aerosil 200CF"
3. Components Used for Producing Laminate
(1) Reinforcing Fiber-Sheet Material s1: sheet material of glass fibers (GF); glass mat (chopped strand mat (CSM) #450, manufactured by Central Glass Co., Ltd., product name "ECM450-501"), 31.5 g per 250 mm×250 mm, basis weight 450 g/m$^2$ s2: sheet material of carbon fibers (CF); manufactured by Toray Co., Ltd., product name "Torayca (registered trademark) cloth CO634," 12.4 g per 250 mm×250 mm, basis weight 198 g/m$^2$ s3: sheet material of glass fibers (GF); glass mat (chopped strand mat (CSM) #300, manufactured by Central Glass Co., Ltd., product name "ECM300-501"), 18.75 g per 250 mm×250 mm, basis weight 300 g/m$^2$
(2) Curing Agent (h)

h2: methylethyl ketoneperoxide manufactured by NOF Corporation, product name: "PERMEK N"
(3) Curing Accelerator (Ha)

ha1: manufactured by Nippon Yupika Co., Ltd., product name: "PR-M"

Production Example 1

<Production of Polylactic Acid (PLA)-Based Resin-Expanded Beads>

As expanded beads of an aliphatic polyester resin, polylactic acid-based resin particles with a multi-layer structure were produced by the following procedures.

An extrusion device was used in which a co-extrusion die for forming multi-layer strands is equipped at the outlet side of a core-layer forming extruder with an inner diameter of 65 mm and a cover layer-forming extruder with an inner diameter of 30 mm.

The core-layer forming extruder was fed with a crystalline polylactic acid resin (PLA-1), and the cover layer-forming extruder was fed with a low-crystalline polylactic acid resin (PLA-2), and then melt-kneading was performed. The melt-kneaded products were introduced into the co-extrusion die at a weight ratio of core layer feed amount/cover layer feed amount=90/10, and merged within the die, and then, were co-extruded into multi-layer strands in which a cover layer was laminated on the outer peripheral surface of a core layer, from small holes of a die provided at the tip of the extruder. The co-extruded strands were cooled with water, cut by a pelletizer such that the weight was about 2 mg, and dried to obtain columnar multi-layer resin particles.

Then, the polylactic acid-based resin-expanded beads were produced by using the above resin particles.

First, 1 kg of the multi-layer resin particles obtained as describe above was introduced into a 5 L airtight container equipped with a stirrer, together with 3 L of water as a dispersing medium, and 0.01 parts by weight of a dispersant, and a surfactant were added in an active component amount to the dispersing medium. Then, the temperature was raised to 140° C. with stirring, and carbon dioxide as a blowing agent was press-injected into the airtight container until the pressure reached 2.8 MPa (G) (indicating a gauge pressure. Hereinafter, the same applies) and was kept at the temperature for 15 min. Then, the temperature was raised to a foaming temperature, and carbon dioxide was press-injected until the pressure reached 3.0 MPa (G), and was kept at the foaming temperature of 145° C. for 15 min. Then, the contents were released under the atmospheric pressure while a back pressure was applied with carbon dioxide, so as to obtain the polylactic acid-based resin-expanded beads (the raw material particles) (the bulk density: 38 kg/m$^3$, the particle weight: 2.0 mg, and the average particle size: 3.3 mm).

Also, the obtained expanded beads were subjected to heat treatment for 8 hours under atmosphere of 70° C.

Production of Composite Particles

Example 1

1. Procedure 1 (Resin Blend)

Each of 10.7 g of a thermosetting resin r1 as the thermosetting resin (r), and 2.0 g of a curing agent h1 as the curing agent (h) was measured and put into a beaker made of polypropylene (PP) with an inner volume of 200 mL, and then stirred to prepare a thermosetting resin mixture.

2. Procedure 2 (Coating)

Then, into a bag made of polyethylene with an inner volume of about 20 L, 16.4 g of expanded beads b0 (the PLA expanded beads in the production example 1) as the raw material particles (b) (adjustment of the degree of crystallinity is complete) was put, and 12.7 g of the thermosetting resin mixture obtained in the procedure 1 was put, and then mixing was performed so that the surface of the expanded beads b0 was uniformly coated with the resin mixture.

3. Procedure 3 (Particulation)

Then, 70.8 g of reinforcing fibers f1 as the reinforcing fibers (f) was put into the bag made of polyethylene in twice, and mixed.

4. Procedure 4 (Classified)

The obtained particulate composite beads were sieved with a metallic mesh having a mesh size of 2 mm (manufactured by Tokyo Screen Co., Ltd.), so that reinforcing fibers not adhering to the expanded beads were removed, and then composite particles b1 being in an uncured state (a B stage product, also referred to as "BSTG beads") were obtained.

The bulk density of the obtained composite particles in the uncured state was 85 kg/m$^3$, and the apparent density was 155 kg/m$^3$. Also, as a result of DSC measurement on the BSTG beads, in Example 1, a curing heat generation peak (calorific value 8.6 J/g) having an apex of 103° C. was observed, and it was determined that a thermosetting resin layer in the composite particles was in an uncured state.

Example 2

1. Procedure 0

The composite particles b1 obtained through the procedures of Example 1 were heated in a hot air oven (manufactured by Espec Corporation, product number: "SPH-202") in a condition of 70° C. and 15 min, and then taken out of the oven and cooled to a room temperature so as to obtain composite particles b1'.

2. Procedures 1 to 3

By using the composite particles b1' obtained through the above procedure 0, as the raw material particles (b), the operation in the above described procedures 1 to 3 was performed according to compounding amounts noted in Table 1 to obtain composite particles b2. That is, a thermosetting resin layer is further stacked on the composite particles in an overlapping manner.

Example 3

Composite particles b3 were obtained in the same manner as in Example 2 except that composite particles b2' were obtained by using the composite particles b2 obtained through the procedures of Example 2, and the composite particles b2' were used as the raw material particles (b).

Example 4

Composite particles b4 were obtained in the same manner as in Example 2 except that composite particles b3' were obtained by using the composite particles b3 obtained through the procedures of Example 3, and the composite particles b3' were used as the raw material particles (b).

Example 5

Composite particles b5 were obtained in the same manner as in Example 2 except that composite particles b4' were obtained by using the composite particles b4 obtained through the procedures of Example 4, and the composite particles b4' were used as the raw material particles (b).

Example 6

Composite particles b6 were obtained in the same manner as in Example 2 except that composite particles b5' were obtained by using the composite particles b5 obtained through the procedures of Example 5, and the composite particles b5' were used as the raw material particles (b).

Example 7

Composite particles b7 were obtained in the same manner as in Example 1 except that raw material particles (described as "EPP" in the table) obtained by adding and mixing 100 g of commercially available "P-block" (bulk density 38 g/L, product name, manufactured by JSP Co., Ltd.) with 16 g of an acid-modified polyolefin solution (manufactured by Mitsui Chemicals, Inc., product name "UNISTOLE P501") as a bonding primer were used as the raw material particles (b), and compounding amounts were changed as noted in Table 1.

Comparative Example 1

Composite particles (bcel1) were produced in the same manner as in Example 1 except that the compounding amount of the raw material particles (b) was changed as noted in Table 1, and the reinforcing fibers (f) were not added.

Comparative Example 2

1. Procedure 1

A thermosetting resin mixture was prepared in the same manner as in Example 1 except that in the procedure 1 of Example 1, the compounding amounts of the thermosetting resin (r) and the curing agent (h) were changed as noted in Table 1.

2. Procedure 2

Then, 29.3 g of reinforcing fibers f1 as the reinforcing fibers (f) was added to and mixed with the thermosetting resin mixture. After expanded beads (b0) were put into a bag made of polyethylene with an inner volume of about 20 L, all of the thermosetting resin mixture to which the reinforcing fibers were previously added was put, and the reinforcing fibers were mixed with the resin mixture.

However, due to adhesion of the resin mixture to the expanded beads, peeling off by vibration, etc., and sticking between composite particles, it was difficult to obtain composite particles excellent in fluidity.

TABLE 1

|  |  |  | Ex. 1 | Ex. 2 | Ex. 3 | Ex. 4 | Ex. 5 | Ex. 6 | Ex. 7 | Comp. Ex. 1 | Comp. Ex. 2 |
|---|---|---|---|---|---|---|---|---|---|---|---|
| Production condition | Particle name | — | b1 | b2 | b3 | b4 | b5 | b6 | b7 | bcel1 | bcel2 |
| | Raw material particles (b) | — | b0 | b1' | b2' | b3' | b4' | b5' | EPP | b0 | b0 |
| | Weight of raw material particles (b) | g | 16.4 | 44.5 | 59.1 | 64.8 | 69.3 | 70.8 | 100 | 16.7 | 39.1 |
| | Thermosetting resin (r) | g | 10.7 | 7.1 | 5.2 | 4.5 | 3.9 | 3.7 | 57.7 | 10.7 | 26.8 |
| | Curing agent (h) | g | 2.0 | 1.4 | 1.0 | 0.9 | 0.7 | 0.7 | 11 | 2 | 4.8 |
| | Reinforcing fibers (f) | g | 70.8 | 47.0 | 34.6 | 29.8 | 26.0 | 24.7 | 422.2 | — | 29.3 |
| | Expanded beads | — | PLA | PLA | PLA | PLA | PLA | PLA | PP | PLA | PLA |
| | Thermosetting resin (r) | — | EP | EP | EP | EP | EP | EP | EP | EP | EP |
| | Reinforcing fibers (f) | — | CF | CF | CF | CF | CF | CF | CF | — | CF |
| | Average fiber length of reinforcing fibers | μm | 150 | 150 | 150 | 150 | 150 | 150 | 150 | — | 150 |
| | Compounding amount of inorganic filler (t) | part by weight | 0 | 0 | 0 | 0 | 0 | 0 | 0 | 0 | 0 |
| Composite particles | Weight ratio of expanded beads | % by weight | 42 | 26 | 18 | 15 | 14 | 13 | 27 | 60 | 46 |
| | Weight ratio of thermosetting resin | | 20 | 27 | 29 | 29 | 31 | 33 | 25 | 40 | 26 |
| | Weight ratio of reinforcing fibers | | 38 | 47 | 53 | 56 | 56 | 54 | 48 | — | 28 |
| | Bulk density | kg/m³ | 85 | 159 | 198 | 245 | 279 | 307 | 129 | 129 | 79 |
| | Average particle size | mm | 3.45 | 3.63 | 3.77 | 3.87 | 4.09 | 4.33 | 3.58 | 3.58 | 3.35 |
| | Thickness of thermosetting resin layer | μm | 90 | 176 | 250 | 299 | 367 | 526 | 154 | 154 | 40.1 |
| | Average content of reinforcing fibers in thermosetting resin layer | % by weight | 66 | 64 | 64 | 66 | 64 | 62 | 66 | — | 51 |
| Composite particles evaluation | Mutual sticking evaluation after 10 min | — | A | A | A | A | A | A | A | C | B |
| | Mutual sticking evaluation after 24 h | — | A | A | A | A | A | A | B | C | C |

Examples 8 to 20

Composite particles were produced in the same manner as in Example 1 except that glass fibers were used as the reinforcing fibers, and items described in Table 2 were changed. Specifically, in Examples 8 to 10, 12 to 15, and 18 to 20, in the procedure 3 of Example 1, after the reinforcing fibers were put, an inorganic filler t1 was added in the compounding amount noted in Table 2. Also, in Example 17, a thermosetting resin r2 as the thermosetting resin (r) was used. Also, except for Example 16, glass fibers f2 were used, and in Example 16, glass fibers f3 were used.

TABLE 2

| | | | Ex. 8 | Ex. 9 | Ex. 10 | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|---|---|---|---|---|
| Production condition | Particle name | — | b8 | b9 | b10 | b11 | b12 | b13 | b14 | b15 | b16 | b17 | b18 | b19 | b20 |
| | Raw material particles (b) | — | b0 | b0 | b0 | b0 | b0 | b0 | b0 | b0 | b0 | b0 | b0 | b0 | b0 |
| | Weight of raw material particles (b) | g | 100 | 100 | 100 | 100 | 100 | 100 | 100 | 100 | 100 | 100 | 140 | 100 | 100 |
| | Thermosetting resin (r) | g | 84.7 | 84.7 | 84.7 | 84.7 | 84.7 | 84.7 | 84.7 | 84.7 | 65.3 | 77 | 33.9 | 84.7 | 84.7 |
| | Curing agent (h) | g | 15.3 | 15.3 | 15.3 | 15.3 | 15.3 | 15.3 | 15.3 | 15.3 | 12.4 | 0.8 | 6.4 | 15.3 | 15.3 |
| | Reinforcing fibers (f) | g | 50 | 150 | 250 | 300 | 300 | 350 | 450 | 600 | 430 | 430 | 10 | 100 | 600 |
| | Expanded beads | — | PLA | PLA | PLA | PLA | PLA | PLA | PLA | PLA | PLA | PLA | PLA | PLA | PLA |
| | Weight of expanded beads | mg | 1.0 | 1.0 | 1.0 | 1.0 | 1.0 | 1.0 | 1.0 | 1.0 | 1.0 | 1.0 | 1.0 | 0.5 | 0.5 |
| | Thermosetting resin (r) | — | EP | EP | EP | EP | EP | EP | EP | EP | EP | UP | EP | EP | EP |
| | Reinforcing fibers (f) | — | GF1 | GF1 | GF1 | GF1 | GF1 | GF1 | GF1 | GF1 | GF2 | GF1 | GF1 | GF1 | GF1 |
| | Average Fiber length of reinforcing fibers | μm | 80 | 80 | 80 | 80 | 80 | 80 | 80 | 80 | 150 | 80 | 80 | 80 | 80 |
| | Compounding amount of inorganic filler (t) | part by weight | 30 | 30 | 25 | 0 | 15 | 10 | 10 | 10 | 0 | 0 | 17 | 30 | 10 |
| Composite particles | Weight ratio of expanded beads | % by weight | 41 | 30 | 24 | 22 | 22 | 21 | 18 | 17 | 22 | 19 | 67 | 35 | 17 |
| | Weight ratio of thermosetting resin | | 33 | 25 | 20 | 20 | 19 | 17 | 15 | 8 | 18 | 12 | 27 | 28 | 8 |
| | Weight ratio of reinforcing fibers | | 26 | 45 | 56 | 59 | 59 | 62 | 67 | 75 | 59 | 68 | 6 | 37 | 75 |
| | Bulk density | kg/m³ | 87 | 118 | 146 | 164 | 158 | 171 | 194 | 211 | 159 | 184 | 53 | 101 | 211 |
| | Average particle size | mm | 3 | 4 | 4 | 4 | 4 | 4 | 4 | 4 | 4 | 4 | 4 | 1.4 | 1.6 |
| | Thickness of thermosetting resin layer | μm | 63 | 130 | 190 | 229 | 217 | 246 | 296 | 332 | 219 | 274 | 19 | 58 | 209 |
| | Content of reinforcing fibers in thermosetting resin layer | % by weight | 44 | 64 | 73 | 75 | 76 | 78 | 82 | 90 | 77 | 85 | 17 | 57 | 90 |
| Composite particles evaluation | mutual sticking evaluation after 10 min | — | A | A | A | A | A | A | A | A | A | A | A | A | A |
| | Mutual sticking evaluation after 24 h | — | A | A | A | B | A | A | A | A | A | A | A | A | A |

<<Production of Composite Particle Cured Product>>

The composite particles (b1) obtained in Example 1 were disposed such that the composite particles are not adjacent to each other, and subjected to heat treatment in a condition of a curing temperature of 120° C., and a curing time of 2 hours so as to completely cure the thermosetting resin layer in the composite particles. The obtained composite particle cured product (b1c) was evaluated by criteria to be described below. The results are noted in Table 3. In Examples 2 to 7, 9, and 15 and Comparative Example 1 as well, composite particle cured products were similarly obtained and evaluated.

TABLE 3

| | | | Ex. 1 | Ex. 2 | Ex. 3 | Ex. 4 | Ex. 5 | Ex. 6 | Ex. 7 | Ex. 9 | Ex. 15 | Comp. Ex. 1 |
|---|---|---|---|---|---|---|---|---|---|---|---|---|
| | Particle name | | b1c | b2c | b3c | b4c | b5c | b6c | b7c | b9c | b15c | b ce1c |
| | Raw material particles | | b1 | b2 | b3 | b4 | b5 | b6 | b7 | b9 | b15 | b ce1 |
| | Curing temperature | ° C. | 120 | 120 | 120 | 120 | 120 | 120 | 120 | 120 | 120 | 120 |
| | Curing time | hr | 2 | 2 | 2 | 2 | 2 | 2 | 2 | 2 | 2 | 2 |
| Composite particle cured product evaluation | 1 MPa | | A | A | A | A | A | A | A | A | A | C |
| | 3 MPa | | B | B | A | A | A | A | B | B | B | C |
| | 6 MPa | | C | C | B | A | A | A | C | C | C | C |

<<Production of Preform>>

A plate-like mold (length 50 mm×width 50 mm×thickness 30 mm) was filled with the composite particles obtained in Examples 2, 8 to 10 and 12, and then the particles were compressed to 10%, 25%, and 50% in the thickness direction, and then subjected to heat treatment (heat press) at a molding press plate temperature of 70° C., for a pressing time of 15 min so as to semi-cure the thermosetting resin layer in the composite particles. Through the above heat treatment, the composite particles were bonded to each other, and a preform molded article in a semi-cured state was obtained. The results are noted in Table 4.

cured beads were dried under reduced pressure at a temperature of 115° C. for 10 hours. From the appearance of the dried beads, cracking and crushing were checked, and the volume reduction rate of the beads was measured. Then, evaluation was made by the following criteria.

(Evaluation Criteria)

A: no cracking or crushing

B: cracking and crushing are observed but the volume reduction rate is less than 5.0%

C: cracking and crushing are observed, and the volume reduction rate is 5.0% or more

TABLE 4

| Raw material particles | | | — | b2 | b8 | b9 | b10 | b12 |
|---|---|---|---|---|---|---|---|---|
| Molding press plate temperature | | ° C. | 70.0 | 70 | 70 | 70 | 70 |
| Pressing time | | min | 15 | 15 | 15 | 15 | 15 |
| Preform molded article evaluation | Molding compression ratio 10% | — | C | A | A | A | A |
| | Molding compression ratio 25% | — | B | A | A | A | A |
| | Molding compression ratio 50% | — | A | A | A | A | A |
| Preform molded article voidage | Molding compression ratio 10% | % | — | 42.5 | 40.1 | 41.5 | 38 |
| | Molding compression ratio 25% | % | 29.0 | 28.9 | 29.1 | 28.9 | 24.8 |
| | Molding compression ratio 50% | % | 22.2 | 21.1 | 18.2 | 21.3 | 15.9 |

<Evaluation Method of Each Evaluation Noted in Tables 1 to 4>

1. Each evaluation noted in Tables 1 and 2 was performed as follows. (Mutual Adhesion Evaluation of Composite Particles; after 10 min, mutual adhesion evaluation, after 24 hours, mutual adhesion evaluation)

The obtained composite particles were put into a 200 mL polypropylene container, and left for 10 min, or 24 hours at room temperature. Then, it was evaluated whether the composite particles adhere to each other.

A: mutual sticking does not occur in the composite particles

B: mutual sticking occurs in a part of the composite particles

C: all composite particles stick to each other and are placed in a clay form (Electron Microscope Photograph of Composite Particles)

The composite particles obtained as described above, and composite particle surfaces were observed and photographed by a scanning electron microscope (magnification 40 times, 300 times), and illustrated in FIGS. 1 to 4.

2. The evaluation of "composite particle cured product evaluation" noted in Table 3 was performed as follows.

(Pressure Resistance Evaluation of Composite Particle Cured Product)

A predetermined amount of the composite particle cured product (cured beads) was collected and put into a draining bag (manufactured by Nippon Giken Industrial Co., Ltd., product name "RI-SH50"), and then the inlet was bound so as to prevent the cured beads from flowing.

Then, the above bag into which the cured beads were put was placed in an airtight container manufactured by AKIKO Corporation (design pressure: 25 MPa, capacity: 1.5 L). By putting a beaker made of PP with a capacity of 300 ml, into the airtight container, 900 mL of water was charged so that the bag was submerged in the water.

After the container was sealed, the valve of a nitrogen gas cylinder connected to the airtight container was opened to increase the pressure within the airtight container to 6 MPa. Pressurization was maintained for 10 min, and after decompression, the cured beads were taken out. The collected 3. The evaluation for "preform molded article evaluation" and the measurement for "preform molded article voidage" as noted in Table 4 were performed as follows.

(Evaluation of Preform Molded Article)

The preform molded article of the obtained composite particles was evaluated by the following evaluation criteria.

A: the composite particles are completely fused without absence

B: in some cases, end portions of the molded article are absent

C: the composite particles are absent without being fused, (Voidage Measuring Method of Composite Particle-Molded Article)

From a preform that was left for 24 hours or more under an environment of a temperature of 23° C. and a relative humidity of 50%, a rectangular parallelepiped sample with an outer dimension of 25 mm×30 mm×50 mm was cut out, and then a bulk volume was found from the outer dimension of the sample. Then, the sample was submerged in a measuring cylinder made of glass (an inner volume of 100 mL) in which 50 mL of ethanol at a temperature 23° C. was contained, by using an instrument such as a wire net, and then air existing between expanded beads was degassed by applying light vibration, etc. Then, in consideration of a volume of the instrument such as a wire net, the true volume ($cm^3$) of the sample, which was read from a water level rise, was measured. From the found bulk volume ($cm^3$) and true volume ($cm^3$) of the sample, the voidage (%) was found by the following equation.

$$\text{Voidage (\%)} = (\text{bulk volume (cm}^3\text{) of sample} - \text{true volume (cm}^3\text{) of sample}) / \text{bulk volume (cm}^3\text{) of sample} \times 100$$

<<Production of Laminate, and Resin Composite (Composite) of Laminate and Thermosetting Resin Cured Product>>

<Production of Composite Particles>

1. Raw Material Particles (b)

The PLA expanded beads b0 in the above production example 1 were used as the raw material particles (b).

2. Production of Composite Particles in Uncured State (1) Production of Composite Particles B1

Composite particles B1 were produced in the same manner as in Example 1 in the production of composite particles except that in the thermosetting resin mixture, the weight of the thermosetting resin (r) and the weight of the curing agent (h), and in the composite particles, the weight of the raw material particles (b), the amount of the thermosetting resin mixture, the type and weight of the reinforcing fibers (f), and the compounding amount of the inorganic filler (t) were changed as noted in Tables 5 and 6.

The bulk density of the obtained composite particles B1 being in an uncured state was 85 kg/m$^3$, and the apparent density was 155 kg/m$^3$. Also, as a result of DSC measurement on the BSTG beads, a curing heat generation peak (calorific value 8.6 J/g at 50 to 130° C.) having an apex of 103° C. was observed, and it was determined that a thermosetting resin layer in the composite particles B1 is in a B stage state. Also, the weight ratio of the expanded beads to the thermosetting resin to the reinforcing fibers in the composite particles B1 was 41:33:26, the average particle size was 3 mm, and the thickness of the thermosetting resin layer was 63 μm.

(2) Production of Composite Particles B2

Composite particles B2 were produced in the same manner as in the production of the composite particles B1 except that in the thermosetting resin mixture, the weight of the thermosetting resin (r) and the weight of the curing agent (h), and in the composite particles, the weight of the raw material particles (b), the amount of the thermosetting resin mixture, the type and weight of the reinforcing fibers (f), and the compounding amount of the inorganic filler (t) were changed as noted in Tables 5 and 6.

The bulk density of the obtained composite particles B2 being in an uncured state was 85 kg/m$^3$, and the apparent density was 155 kg/m$^3$. Also, as a result of DSC measurement on the BSTG beads, a curing heat generation peak (calorific value 8.6 J/g at 50 to 130° C.) having an apex of 103° C. was observed, and it was determined that a thermosetting resin layer in the composite particles B2 is in a B stage state. Also, the weight ratio of the expanded beads to the thermosetting resin to the reinforcing fibers in the composite particles B2 was 42:20:38, the average particle size was 3.5 mm, and the thickness of the thermosetting resin layer was 66 μm.

Example 21

1-1. Production of Laminate 93.8 g of the composite particles B1 was weighed, and then while closing a mold with cracking of 17.6 mm, the composite particles B1 were air-fed and filled into a plate-like mold (length 250 mm×width 250 mm×thickness 10 mm) from a fill feeder, compressed to 76% by volume in the thickness direction, and subjected to heat treatment (heat press) at 70° C. for 15 min. Due to the heat press, the composite particles B1 were bonded to each other, and a composite particle-molded article 1 in a semi-cured state was obtained. On each of both surfaces of the composite particle-molded article 1 in the semi-cured state, one reinforcing fiber-sheet material s1 (glass fibers) was laminated to obtain a laminate 1.

1-2. Production of Package

The composite particle-molded article 1 and the laminate 1 were vacuum-packed using a table top nozzle-type degas sealer manufactured by Fuji Impulse Co., Ltd. In the packaging method, while the composite particle-molded article 1 and the laminate 1 were put in a vacuum packaging film (length 400 mm×width 300 mm×thickness 0.07 mm), vacuum suction was performed. Then, the vacuum packaging film was heat-welded under reduced pressure of −80 kPa (G) to obtain a vacuum package.

2. Production of Resin Composite (Composite)

(1) Preparation of Casting Resin 100 parts by weight of unsaturated polyester resin (manufactured by Nippon Yupika Co., Ltd., product name: "6424") as the thermosetting resin (r), 1.0 part by weight of the curing agent h2, and 0.5 parts by weight of the curing accelerator ha1 were mixed to produce a thermosetting resin mixture.

(2) Impregnation of Laminate with Casting Resin, and Curing

The laminate 1 was set in an RTM mold, and 274 g of the thermosetting resin mixture was injected into the mold to impregnate the laminate 1 with the thermosetting resin mixture. Through room-temperature curing at room temperature for 20 min, the molding was completed, and releasing was performed. After released, a composite molded product was post-cured in a dry-oven of 80° C. for 60 min to obtain a resin composite 1. Through the post-curing operation, a curing reaction of the unsaturated polyester in the thermosetting resin mixture, or the laminate is resumed to completely cure the thermosetting resin.

Examples 22 to 291

1. Production of Laminates 2 to 5

A composite particle-molded article in a semi-cured state was obtained in the same manner as in Example 21 except that in a laminate, the type and the compounding amount of composite particles, and the compression ratio were changed as noted in Tables 5 and 6. A reinforcing fiber-sheet material was laminated and laminates 2 to 5 were obtained in the same manner as in Example 21 except that for the composite particle-molded article in the semi-cured state, the reinforcing fiber-sheet material was changed as noted in Tables 5 and 6.

2. Production of Resin Composite

Except that items noted in Tables 5 and 6 were changed, in the same manner as in Example 21, the laminate was set in an RTM mold, and the thermosetting resin mixture prepared in the production of the laminate 1 was injected into the mold to impregnate the laminate with the thermosetting resin mixture. Through room-temperature curing at room temperature for 20 min, the molding was completed and releasing was performed. After released, a composite molded product was post-cured in a dry-oven of 80° C. for 60 min to obtain resin composites (composites) 2 to 5.

Comparative Example 3

1. Production of Laminate

A laminate 101 was obtained in the same manner as in the production of the laminate 1 except that the reinforcing fiber-sheet material s1 was not laminated on the composite particle-molded article 1 in the semi-cured state.

2. Production of Resin Composite (Composite)

The laminate 101 was set in an RTM mold, and 169 g of the thermosetting resin mixture prepared in the production of the laminate 1 was injected into the mold to impregnate the laminate 101 with the thermosetting resin mixture. Through room-temperature curing at room temperature for 20 min, the molding was completed and releasing was performed. After released, a composite molded product was post-cured in a dry-oven of 80° C. for 60 min to obtain a resin composite 101.

Comparative Example 4

On a polyethylene film, 191 g of glass fibers GF (chopped strands) cut into about 50 mm was substantially uniformly sowed. From above, the chopped strands were poured with 388 g of a resin paste obtained by mixing an unsaturated polyester-based resin, a curing agent, a thickener, an internal releasing agent, and a filler, subjected to uniform impregnation, and molded in a substantially uniform thickness by passing through a roll provided with a uniform clear while the top surface was covered with the polyethylene film. Then, a sheet-like thing having both surfaces covered with the film was wound in a roll shape, and heated in a condition of 100° C. and 10 min so that the viscosity was increased. Then, a raw fabric of a sheet molding compound (SMC) was obtained. This was set as a resin composite 102 of Comparative Example 4.

Comparative Example 5

Four glass mats (reinforcing fiber-sheet material s3, 18.8 g per sheet) were laminated to obtain a laminate 103.

Then, 100 parts by weight of unsaturated polyester resin (manufactured by Nippon Yupika Co., Ltd., product name: "4183PT-2") as the casting resin, 1.0 part by weight of the curing agent h2, and 0.5 parts by weight of the curing accelerator ha1 were mixed to prepare a mix solution.

The laminate 103 was impregnated with 164 g of the obtained mix solution through hand lay-up molding, and through curing, a GFRP veneer was obtained. This was set as a resin composite 103 of Comparative Example 5.

<Physical Property Measurement of Composite Particle-Molded Article, Laminate, and Resin Composite>

(Voidage Measurement Method of Composite Particle-Molded Article)

Through the above described method, the voidage measurement of a composite particle-molded article was performed. The results are noted in the column "composite particle-molded article voidage" of the column "laminate" in Tables 5 and 6.

(Density Calculation Method of Composite Particle-Molded Article, Laminate, and Resin Composite)

The volume H (liter) was found from the outer dimension of a sample, and a value obtained by dividing the weight W (g) of the sample by the volume H was set as the density ($kg/m^3$) of the sample. Also, the weight of a resin composite is noted in the column "resin composite weight" of the column "resin composite" in Tables 5 to 6.

The results of the density of the composite particle-molded article are noted in the column "composite particle-molded article density" of the column "laminate" in Tables 5 to 6.

The results of the density of the laminate are noted in the column "laminate density" of the column "laminate" in Tables 5 to 6.

The results of the density of the resin composite are noted in the column "resin composite density" of the column "resin composite" in Tables 5 to 6.

<Evaluation of Resin Composite>

For each of molded plates, in the resin composites of Examples 21 to 29 and Comparative Example 3, the SMC plate of Comparative Example 4, and the GFRP veneer of Comparative Example 5, a 1 mm-flexural bending load and a maximum bending load were measured specifically by the following method in accordance with JIS K7171:2006.

After each molded plate was left for 24 hours or more within a constant room (the room temperature of 23° C. and the humidity of 50%), a flexure-bending load curve (SS curve) was measured by "Autograph AGS-10 kNG tester" manufactured by Shimadzu Corporation under a condition that a distance between supporting points was 64 mm, the radius R of an indenter was 5.0 mm, the radius R of a support was 2.0 mm, the test speed was 10 mm/min, the room temperature was 23° C., and the humidity was 50%.

The maximum bending load (maximum yield point) (N) of the SS curve and the bending load when a deflection amount was 1 mm (1 mm-flexural bending load (N)) were measured, and then the average value of measurement values at five or more points was employed as a measurement result.

Also, by dividing each measurement result by the weight of the molded plate, the maximum bending load (N/g) per weight and the 1 mm-flexural bending load (N/g) per weight were calculated.

TABLE 5

| | | | | Ex. 21 | Ex. 22 | Ex. 23 | Ex. 24 | Ex. 25 | Ex. 26 |
|---|---|---|---|---|---|---|---|---|---|
| Laminate | Thermosetting resin mixture | Weight of thermosetting resin (r) | g | 50 | 50 | 50 | 50 | 50 | 50 |
| | | Weight of curing agent (h) | g | 9.5 | 9.5 | 9.5 | 9.5 | 9.5 | 9.5 |
| | Composite particles | Weight of raw material particles (b) | g | 28 | 28 | 28 | 28 | 28 | 39 |
| | | Amount of thermosetting resin mixture | g | 28 | 28 | 28 | 28 | 28 | 41 |
| | | Reinforcing fibers (f) | — | GF1 | GF1 | GF1 | GF1 | GF1 | CF |
| | | Weight of reinforcing fibers (f) | g | 28 | 28 | 28 | 28 | 28 | 20 |
| | | Compounding amount of inorganic filler (t) | g | 10 | 10 | 10 | 10 | 10 | 16 |
| | | Composite particle name | — | B1 | B1 | B1 | B1 | B1 | B2 |
| | Reinforcing fiber sheet material | material | — | GF1 | GF1 | GF1 | GF1 | GF1 | CF |
| | | Total weight | g | 63 | 63 | 63 | 37.5 | 75 | 25 |
| | | Average fiber length | mm | >100 mm | >100 mm | >100 mm | >100 mm | >100 mm | >100 mm |
| | | Sheet material type | — | s1 | s1 | s1 | s3 | s3 | s2 |
| | | Sticking position | — | both surfaces | both surfaces | both surfaces | both surfaces | both surfaces | both surfaces |
| | Amount of composite particles | | g | 93.8 | 81.8 | 112.6 | 93.8 | 93.8 | 115.6 |
| | Compression ratio | | % by volume | 76 | 54 | 112 | 76 | 76 | 118 |
| | Composite particle-molded article density | | $kg/m^3$ | 251 | 131 | 180 | 150 | 150 | 185 |

TABLE 5-continued

|  |  |  | Ex. 21 | Ex. 22 | Ex. 23 | Ex. 24 | Ex. 25 | Ex. 26 |
|---|---|---|---|---|---|---|---|---|
|  | Composite particle-molded article voidage | % | 15 | 20 | 7 | 15 | 15 | 7 |
|  | Laminate density | kg/m³ | 240 | 232 | 281 | 210 | 270 | 225 |
| Resin composite | Casting resin amount | g | 274 | 307 | 222 | 274 | 274 | 59 |
|  | Resin composite weight | g | 431 | 452 | 397 | 405 | 443 | 200 |
|  | Resin composite density | kg/m³ | 690 | 723 | 636 | 649 | 709 | 320 |
|  | Resin composite thickness | mm | 10 | 10 | 10 | 10 | 10 | 10 |
|  | 1 mm Flexural bending load | N | 200 | 210 | 180 | 160 | 220 | 214 |
|  | 1 mm Flexural bending load/weight | N/g | 0.46 | 0.46 | 0.45 | 0.39 | 0.50 | 1.07 |
|  | Maximum bending load | N | 7100 | 7530 | 5500 | 5970 | 7740 | 2960 |
|  | Maximum bending load/weight | N/g | 16.48 | 16.66 | 13.84 | 14.72 | 17.47 | 14.80 |

TABLE 6

|  |  |  |  | Ex. 27 | Ex. 28 | Ex. 29 | Comp. Ex. 3 | Comp. Ex. 4 | Comp. Ex. 5 |
|---|---|---|---|---|---|---|---|---|---|
| Laminate | Thermosetting resin mixture | Weight of thermosetting resin (r) | g | 50 | 50 | 50 | 50 | — | — |
|  |  | Weight of curing agent (h) | g | 9.5 | 9.5 | 9.5 | 9.5 | — | — |
|  | Composite particles | Weight of raw material particles (b) | g | 39 | 39 | 28 | 28 | — | — |
|  |  | Amount of thermosetting resin mixture | g | 41 | 41 | 28 | 28 | — | — |
|  |  | Reinforcing fibers (f) | — | CF | CF | GF1 | GF1 | — | — |
|  |  | Weight of reinforcing fibers (f) | g | 20 | 20 | 28 | 28 | 191 | — |
|  |  | Compounding amount of inorganic filler (t) | g | 16 | 16 | 10 | 10 | — | — |
|  |  | Composite particle name | — | B2 | B2 | B1 | B1 | — | — |
|  | Reinforcing fiber sheet material | Material | — | CF | CF | GF | — | GF | GF |
|  |  | Total weight | g | 25 | 25 | 32 | 0 | — | 75 |
|  |  | Average fiber length | mm | >100 mm | >100 mm | >100 mm | — | — | — |
|  |  | Sheet material type | — | s2 | s2 | s1 | — | — | s3 |
|  |  | Sticking position | — | both surfaces | both surfaces | one surface | — | — | — |
|  | Amount of composite particles | | g | 95.6 | 82.9 | 93.8 | 93.8 | — | — |
|  | Compression ratio | | % by volume | 80 | 56 | 76 | 78 | — | — |
|  | Composite particle-molded article density | | kg/m³ | 153 | 133 | 150 | — | — | — |
|  | Composite particle-molded article voidage | | % | 15 | 20 | 15 | 15 | — | — |
|  | Laminate density | | kg/m³ | 193 | 173 | 201 | 150 | — | — |
| Resin composite | Casting resin amount | | g | 274 | 307 | 274 | 169 | 388 | 164 |
|  | Resin composite weight | | g | 395 | 415 | 400 | 262 | 578 | 239 |
|  | Resin composite density | | kg/m³ | 632 | 664 | 640 | 420 | 1850 | 1530 |
|  | Resin composite thickness | | mm | 10 | 10 | 10 | 10 | 5 | 2.5 |
|  | 1 mm Flexural bending load | | N | 399 | 413 | 90 | 80 | 80 | 15 |
|  | 1 mm Flexural bending load/weight | | N/g | 1.01 | 0.99 | 0.23 | 0.31 | 0.14 | 0.06 |
|  | Maximum bending load | | N | 7270 | 7810 | 3220 | 550 | 3990 | 200 |
|  | Maximum bending load/weight | | N/g | 18.41 | 18.81 | 8.05 | 2.10 | 6.90 | 0.84 |

As found from Tables 5 and 6, the resin composites of Examples were lightweight, and both the 1 mm-flexural bending load and the maximum bending load were increased. In particular, the resin composite of Example 6, which used the carbon fibers for each of the reinforcing fibers and the reinforcing fiber-sheet material, had the lightest weight, among all Examples and all Comparative Examples, but became a resin composite high in the strength because the 1 mm-flexural bending load was large, and the 1 mm-flexural bending load per weight was maximum.

<<Composite Molded Product of Composite Particle-Molded Article (Preform) and Thermosetting Resin Cured Product>>

From a preform produced by the composite particles of the present invention, a composite molded product with a thermosetting resin cured product was produced.

Composite Molded Product Example 1

The preform in a semi-cured state obtained in Example 9 was set in a plate-like mold (length 50 mm×width 50 mm×thickness 30 mm), and a mixture obtained by mixing 1.0 part by weight of the curing agent h2, and 0.3 parts by weight of the curing accelerator ha1 with 100 parts by weight of a thermosetting resin (unsaturated polyester resin, manufactured by Nippon Yupika Co., Ltd. product name "6424") was injected into the plate-like mold, followed by curing and molding. Then, the released molded product was heated in a dry-oven of 80° C. for 60 min and completely cured to obtain a composite molded product.

The voidage of the preform in the semi-cured state obtained in Example 9 was 29.1%, and the above mixture was injected to completely fill voids. Then, a composite molded product example 1 with a density of 503 kg/m³ was obtained.

Composite Molded Product Example 2

A composite molded product example 2 was obtained in the same manner as in the above production example 1 except that the preform in a semi-cured state obtained in Example 12 was used and 50 parts by weight of the reinforcing fibers f2 was mixed.

The voidage of the preform in the semi-cured state obtained in Example 12 was 24.8%, and the above mixture was injected to completely fill voids. Then, the composite molded product with a density of 644 kg/m³ was obtained.

The above composite molded product examples 1 and 2 obtained in the composite molded product production examples 1 and 2 were cured for 24 hours in a constant temperature and constant humidity chamber of 23° C., and then the compression stress was measured in accordance with JIS K7220:2006. Also, on a test piece (50 mm×50 mm, thickness 30 mm), measurement was performed at a test speed of 10 mm/min. The results of compression stress are noted in Table 7.

Also, each of the composite molded product examples 1 and 2 has a maximum compression stress of 10 MPa or more, and thus may withstand a water pressure of 1000 m in deep sea and may be possibly used as a buoyancy material for deep sea.

TABLE 7

| | | | Composite Molded Product Example 1 | Composite Molded Product Example 2 |
|---|---|---|---|---|
| Preform | | Raw Material Particle | b9 | b12 |
| | | Voidage | 29.1 | 24.8 |
| | | Weight | 11.0 | 14.7 |
| | | Density (kg/m³) | 150.9 | 198.2 |
| Thermosetting Resin Mixture | Thermosetting resin | part by weight | 100 | 100 |
| | Curing accelerator | part by weight | 0.3 | 0.3 |
| | Curing agent | part by weight | 1 | 1 |
| | Reinforcing fibers | part by weight | 0 | 50 |
| | Thermosetting resin weight | g | 25.7 | 33.1 |
| Composite Molded Product | Weight | g | 36.77 | 47.85 |
| | Density | kg/m³ | 503.0 | 644.0 |
| | Maximum compression stress | MPa | 13.0 | 17.0 |

From the composite particles of the present invention, a composite molded product was separately produced by the following procedure.

Composite Molded Product Example 3

A plate-like mold (length 230 mm×width 230 mm×thickness 6 mm) was filled with 75 g of the composite particles obtained in Example 12, and then the particles were compressed to 25% in the thickness direction, and subjected to heat treatment (heat press) at 70° C. for 15 min to semi-cure the thermosetting resin layer of the composite particles. Due to the above heat treatment, the composite particles were bonded to each other, and a preform molded article (voidage: 25%, molded product density: 198 kg/m³) in a semi-cured state was obtained. Also, the preform in the semi-cured state was set in a plate-like mold (length 230 mm×width 230 mm×thickness 8 mm), and a thermosetting resin mixture was produced by mixing 100 parts by weight of unsaturated polyester resin (manufactured by Nippon Yupika Co., Ltd., product name: "6424"), 1.0 part by weight of the curing agent h2, 0.5 parts by weight of "PR-M" (product name) manufactured by Nippon Yupika Co., Ltd. as the curing accelerator, and 30 parts by weight of the reinforcing fibers f2. 182 g of the mixture was injected into the mold, and the preform was impregnated with the thermosetting resin mixture. Then, through curing at room temperature for 20 min, a molded product was obtained.

This curing reaction involves heat generation and thus the unsaturated polyester resin and the preform are completely cured, while the temperature of near the surface of the product is lower than that of the inside thereof and thus curing is not completely performed. Therefore, after taken out of the mold, the molded product was post-cured in a dry-oven of 80° C. for 60 min to obtain a composite molded product in which the thermosetting resin was completely cured. Through the post-curing operation, a curing reaction of the unsaturated polyester in the thermosetting resin mixture, or the preform is resumed to completely cure the thermosetting resin.

Composite Molded Product Example 4

63 g of the composite particles obtained in Example 9 was molded in the same manner as in the above composite molded product example 3 to obtain a preform molded article in a semi-cured state (voidage: 29%, molded product density: 145 kg/m³). On each of top and bottom of the preform in the semi-cured state, one glass mat (chopped strand mat (CSM) #450, manufactured by Central Glass Co., Ltd., product name "ECM450-501," 45 g per sheet, described as "CSM" in the table) was laminated to obtain a laminate. The thermosetting resin mixture used in the above composite molded product example 3 was separately produced. The above laminate was set in an RTM mold, and 128 g of the thermosetting resin mixture was injected into the mold to impregnate the preform with the thermosetting resin mixture. Through curing at room temperature for 20 min, the molding was completed, and releasing was performed. After released, a composite molded product was post-cured in a dry-oven of 80° C. for 60 min.

A GFRP veneer was separately produced.

GFPR Veneer Molding Example 1

Four glass mats (chopped strand mats (CSM) #450, manufactured by Central Glass Co., Ltd., product name "ECM450-501") were laminated, and were impregnated with a thermosetting resin mix solution obtained by mixing 100 parts by weight of unsaturated polyester resin (manufactured by Nippon Yupika Co., Ltd., product name: 4183PT-2), 1.0 part by weight of the curing agent h2, and 0.5 parts by weight of "PR-M" (product name, manufactured by Nippon Yupika Co., Ltd.) as the curing accelerator through hand lay-up molding, and through curing, a GFRP veneer was obtained.

GFRP Veneer Molding Example 2

A GFRP veneer was obtained in the same manner as in the GFRP veneer molding example 1 except that six glass mats (chopped strand mats (CSM) #450, manufactured by Central Glass Co., Ltd., product name "ECM450-501") were laminated.

GFPR Veneer Molding Example 3

30 parts by weight of the reinforcing fibers f2 was mixed with 100 parts by weight of a mix solution of 100 parts by weight of unsaturated polyester resin (manufactured by Nippon Yupika Co., Ltd., product name: 6424), 1.0 part by weight of the curing agent h2, and 0.5 parts by weight of the curing accelerator ha1. The thermosetting resin mixture was spread on a glass plate provided with a frame to a thickness of 3.5 to 4.0 mm and cured, and then a GFRP veneer was obtained.

Physical properties and the like of the composite molded products, and the GFRP veneers obtained as described above are noted in Table 8. Also, for the composite molded products and the GFRP veneers, the 0.5 mm-flexural bending load and the maximum yield point load were measured specifically by the following method in accordance with JIS K7171:2006.

First, from each molded product, a test piece was cut out to have width 10 mm×length 80 mm. The test piece was cut out such that cutting faces were formed except for top and bottom surfaces in the thickness direction, and then test pieces having thicknesses of 8.5 mm for the composite molded product example 3, 8.2 mm for the composite molded product example 4, 2.8 mm for the GFRP veneer 1, 3.9 mm for the GFRP veneer 2, 2.7 mm for the GFRP veneer 3, and 3.7 mm for the GFRP veneer 4 were used. After the cut-out test piece was left within a constant room with a room temperature of 23° C. and a humidity of 50% for 24 hours or more, a flexure-bending load curve (SS curve) was measured by "Autograph AGS-10 kNG tester" manufactured by Shimadzu Corporation under a condition that a distance between supporting points was 64 mm, the radius R of an indenter was 5.0 mm, the radius R of a support was 2.0 mm, the test speed was 10 mm/min, the room temperature was 23° C., and the humidity was 50%.

The maximum yield point load (yield point) (N) of the SS curve and the load when a deflection amount was 0.5 mm (0.5 mm-deflection load (N)) were measured, and then the average value of measurement values at five or more points was employed as a measurement result.

The thickness of a composite molded plate was about 8 mm. For comparison between the composite molded product and the resin veneer, data was compared in the initial deflection load per unit area weight (0.5 mm displacement) and the maximum yield point load. It was found that the initial deflection load value was obviously higher in the composite molded product. Although the GF content was the same, it was determined that the preform composite molded product had an improved numerical value of the initial deflection load as compared to the FRP veneer due to the effect that the unit area weight (basis weight) became lighter, the product thickness increased, and thus the section modulus increased.

TABLE 8

|  |  |  | Composite Molded Product Example 3 | Composite Molded Product Example 4 | GFPR Veneer 1 | GFPR Veneer 2 | GFPR Veneer 3 | GFPR Veneer 4 |
|---|---|---|---|---|---|---|---|---|
| Composite molded product | Weight | g | 258.5 | 235.7 | — | — | — | — |
|  | Density | kg/m$^3$ | 610.9 | 556.9 | 1310.1 | 1367.2 | 1309.0 | 1306.1 |
|  | Thickness | mm | 8.5 | 8.2 | 2.8 | 3.9 | 2.7 | 3.7 |
|  | Basis weight | kg/m$^2$ | 5.2 | 4.6 | 3.6 | 5.3 | 3.6 | 4.8 |
|  | Content of reinforcing fibers | % by weight | 32.8 | 31.2 | 30.0 | 30.0 | 30.0 | 30.0 |
|  | 0.5 mm Deflection load | N | 73.2 | 62.8 | 13.8 | 29.9 | 7.0 | 16.5 |
|  | Maximum yield point load | N | 182.84 | 237.69 | 306.5 | 167.9 | 68.1 | 118.6 |

Also, prototype molding was performed using a propeller that is used for shipbuilding or small hydropower in some cases. If a propeller with an outer form of φ500×h17-170 (mm), and a volume of 3690 cc is made of brass, the weight is about 31.2 kg (the density of 8.45 g/cm$^3$). Also, if a propeller is made of FRP, the weight is about 5.5 kg (the density of 1.5 g/cm$^3$). Meanwhile, when a propeller was produced by a composite molded product obtained from a preform of the composite particles in the present invention, the weight was about 2.2 kg (the density of 0.25 g/cm$^3$), and it was possible to reduce the weight by 93% as compared to the brass-made one, and to reduce the weight by 60% as compared to the FRP-made one. Also, in the preform, it is also easy to secure a bonding property with different materials such as a metal. Thus, during compounding, it is possible to obtain neutral buoyancy in water by adjusting the density through insertion of a metal or the like. Then, it is also possible to mold a preform composite product that is hardly susceptible to water resistance.

In the composite particles of the present invention, the composite particles hardly stick to each other, and a mold or the like may be filled with the composite particles. Thus, it is easy to freely set the shape of a final molded product, and the moldability is excellent. Therefore, the composite particles of the present invention may be suitably used as a foaming core material for a carbon fiber composite material.

Also, in a laminate obtained by bonding a reinforcing fiber-sheet material to a composite particle-molded article, the voidage may be controlled so that the strength of a composite obtained through impregnation of a thermosetting resin may be controlled.

The invention claimed is:

1. Composite particles comprising a thermoplastic layer in which reinforcing fibers adhere to a surface of thermoplastic resin expanded beads via a thermosetting resin layer being in an uncured state,
   wherein a portion of the reinforcing fibers in the thermosetting resin layer exist buried in the thermosetting resin layer and a further portion of the reinforcing fibers is exposed on an outer surface of the thermosetting resin layer, and wherein more of the reinforcing fibers in the thermosetting resin layer exist on an outer surface side of the thermosetting resin layer than on a central portion of the thermosetting resin layer in a thickness direction.

2. The composite particles according to claim 1, wherein a weight ratio of the thermosetting resin layer to the reinforcing fibers in the composite particles is 5:95 to 95:5.

3. The composite particles according to claim 1, wherein a ratio of a total weight of the thermosetting resin layer and the reinforcing fibers to a weight of the expanded beads is 0.3 to 8.

4. The composite particles according to claim 1, wherein an average particle size of the composite particles is 1 to 10 mm.

5. The composite particles according to claim 1, wherein a thermoplastic resin constituting the expanded beads is a polyester-based resin.

6. The composite particles according to claim 1, wherein a bulk density of the composite particles is 30 to 700 kg/m$^3$.

7. A composite particle cured product obtained by curing the thermosetting resin layer in the composite particles according to claim 1.

8. A composite particle in-mold molded article of the composite particles according to claim 1.

9. The composite particle in-mold molded article according to claim 8, which has a voidage of 3 to 40% by volume.

10. The composite particles according to claim 1, wherein a thickness of the thermosetting resin layer in the composite particles is 4 to 1000 µm.

11. The composite particles according to claim 1, wherein a ratio of a thickness of the thermosetting resin layer to an average particle size of the composite particles is 0.01 to 0.2.

* * * * *